United States Patent
Ando

(10) Patent No.: US 10,767,760 B2
(45) Date of Patent: Sep. 8, 2020

(54) POWER TRANSMISSION SYSTEM, AND CONTROL METHOD OF POWER TRANSMISSION SYSTEM THAT FAVORABLY SUPPRESS UNUSUAL SOUND GENERATED FROM A SWITCHING SLEEVE

(71) Applicant: TOYOTA JIDOSHA KABUSHIKI KAISHA, Toyota-shi, Aichi-ken (JP)

(72) Inventor: Koji Ando, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 196 days.

(21) Appl. No.: 16/028,850

(22) Filed: Jul. 6, 2018

(65) Prior Publication Data

US 2019/0011044 A1    Jan. 10, 2019

(30) Foreign Application Priority Data

Jul. 10, 2017 (JP) ................. 2017-135044

(51) Int. Cl.
*F16H 61/04* (2006.01)
*B60K 17/344* (2006.01)
(Continued)

(52) U.S. Cl.
CPC ....... *F16H 61/0403* (2013.01); *B60K 17/344* (2013.01); *F16H 3/54* (2013.01);
(Continued)

(58) Field of Classification Search
CPC .......... B60K 17/344; B60K 2006/4825; B60K 2006/4816; F16H 37/065; F16H 61/0403; F16H 3/54; F16H 3/78; F16H 2200/2035; F16H 2200/2064; F16H 2200/2005; F16H 2200/0034; F16H 2200/2094; F16H 2061/0422

See application file for complete search history.

(56) References Cited

U.S. PATENT DOCUMENTS 7,455,135 B2 * 11/2008 Janson ................. B60K 6/48
                                                 180/65.31
2008/0081726 A1    4/2008 Saito et al.
(Continued)

FOREIGN PATENT DOCUMENTS

JP    2008-087607 A    4/2008
JP    5333704 B1       11/2013

*Primary Examiner* — David R Morris
*Assistant Examiner* — Lori Wu
(74) *Attorney, Agent, or Firm* — Oliff PLC

(57) ABSTRACT

A power transmission system include a transfer case including an input shaft, an output shaft, a planetary gear device including a first rotary element, a second rotary element, and a third rotary element, and a HIGH-LOW switching mechanism including a switching sleeve configured to selectively couple the output shaft to the first rotary element and the second rotary element, an electric motor coupled to one of the first rotary element and the second rotary element, and an electronic control unit configured to control the rotational speed of the electric motor, during switching operation of the HIGH-LOW switching mechanism while a vehicle is stopped, such that the rotational speed of the input shaft becomes substantially equal to zero.

6 Claims, 18 Drawing Sheets

(51) Int. Cl.
  *F16H 3/54* (2006.01)
  *F16H 3/78* (2006.01)
  *F16H 37/06* (2006.01)
  *B60K 6/48* (2007.10)

(52) U.S. Cl.
  CPC ............ *F16H 3/78* (2013.01); *F16H 37/065* (2013.01); *B60K 2006/4816* (2013.01); *B60K 2006/4825* (2013.01); *F16H 2061/0422* (2013.01); *F16H 2200/0034* (2013.01); *F16H 2200/2005* (2013.01); *F16H 2200/2035* (2013.01); *F16H 2200/2064* (2013.01); *F16H 2200/2094* (2013.01); *F16H 2200/2097* (2013.01)

(56) References Cited

U.S. PATENT DOCUMENTS

| | | | |
|---|---|---|---|
| 2012/0077633 A1* | 3/2012 | Mueller | B60K 6/365 |
| | | | 475/5 |
| 2014/0007740 A1* | 1/2014 | Takahashi | B60K 6/445 |
| | | | 74/665 A |
| 2014/0162825 A1 | 6/2014 | Sugimoto | |
| 2016/0176407 A1* | 6/2016 | Sharma | B60K 17/08 |
| | | | 701/58 |

* cited by examiner

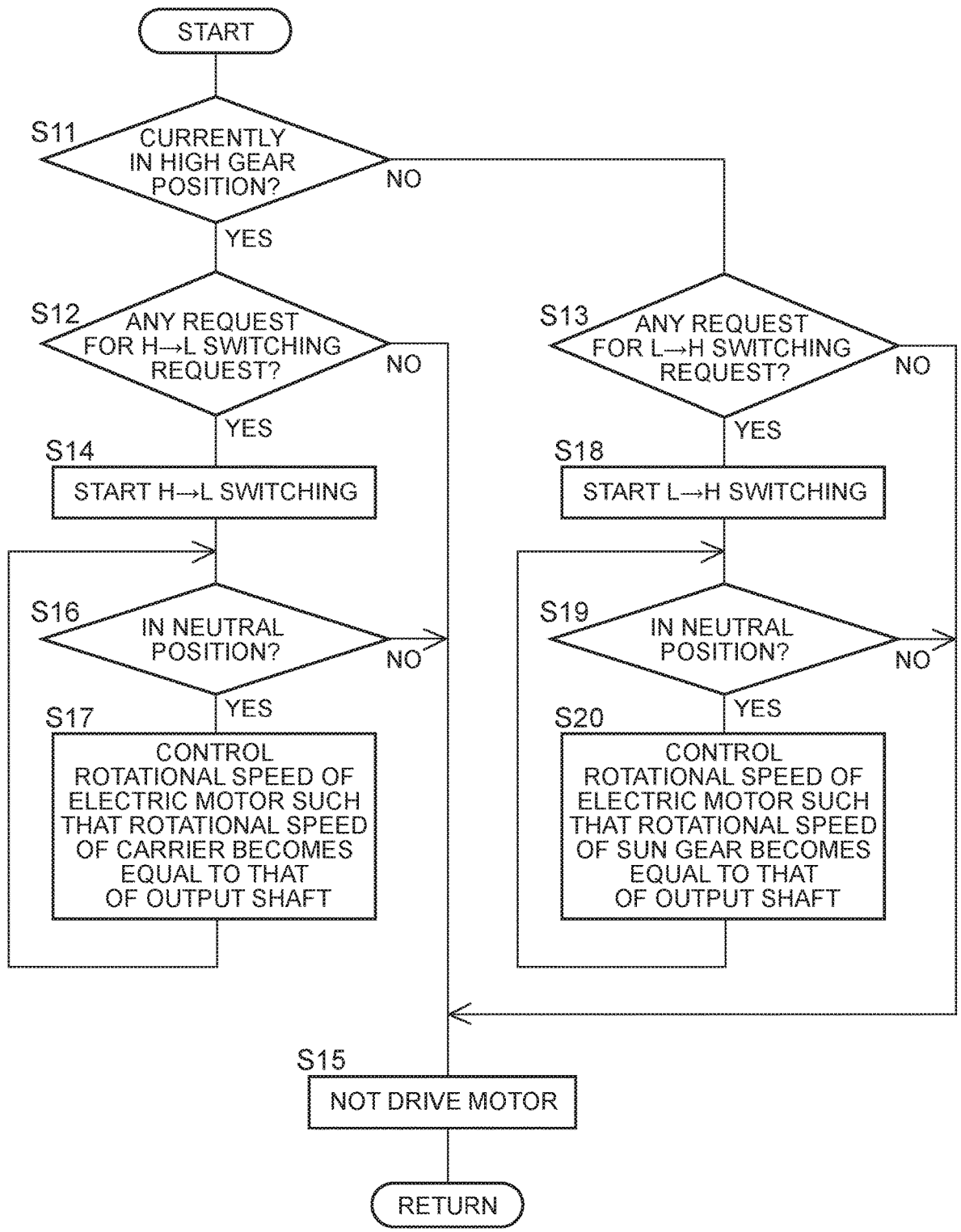

POWER TRANSMISSION SYSTEM, AND CONTROL METHOD OF POWER TRANSMISSION SYSTEM THAT FAVORABLY SUPPRESS UNUSUAL SOUND GENERATED FROM A SWITCHING SLEEVE

INCORPORATION BY REFERENCE

The disclosure of Japanese Patent Application No. 2017-135044 filed on Jul. 10, 2017 including the specification, drawings and abstract is incorporated herein by reference in its entirety.

BACKGROUND

1. Technical Field

The disclosure relates to a power transmission system and a control method of a power transmission system.

2. Description of Related Art

A power transmission system, which transmits power from a drive source to main drive wheels and sub drive wheels, is disclosed in Japanese Unexamined Patent Application Publication No. 2008-87607 (JP 2008-87607 A). The power transmission system includes an input shaft, an output shaft, a planetary gear device including a first rotary element, a second rotary element, and a third rotary element, and a switching sleeve, and further includes a HIGH-LOW switching mechanism. The input shaft receives power from the drive source. The output shaft transmits power to the main drive wheels and the sub drive wheels. The first rotary element is coupled to the input shaft, and is selectively coupled to the output shaft. The second rotary element is selectively coupled to the output shaft. The third rotary element is coupled to a non-rotary member. The switching sleeve selectively couples the output shaft to the first rotary element and the second rotary element. The HIGH-LOW switching mechanism is operable to switch the switching sleeve between a high-gear position in which the output shaft and the first rotary element are coupled such that power is transmitted therebetween, and a low-gear position in which the output shaft and the second rotary element are coupled such that power is transmitted therebetween.

SUMMARY

In the power transmission system as disclosed in JP 2008-87607 A, in the process of switching the switching sleeve between the high-gear position in which the output shaft and the first rotary element are coupled such that power is transmitted therebetween, and the low-gear position in which the output shaft and the secondary rotary element are coupled such that power is transmitted therebetween (during switching operation of the HIGH-LOW switching mechanism), the switching sleeve is once switched to a neutral position in which the switching sleeve does not couple the output shaft to either one of the first rotary element and the second rotary element, and then switched to the high-gear position or the low-gear position. Therefore, in the power transmission system as disclosed in JP 2008-87607 A, when the switching sleeve is once placed in the neutral position, in the process of switching the switching sleeve between the high-gear position and the low-gear position while the vehicle is stopped, the rotational speed of the input shaft, namely, the rotational speeds of the first rotary element and the second rotary element, increase from zero, and then, the first rotary element or the second rotary element rotating at the increased rotational speed is coupled to the output shaft of which rotation is stopped while the vehicle is stopped, through engagement with the switching sleeve. Thus, in the process of switching the switching sleeve between the high-gear position and the low-gear position while the vehicle is stopped (during switching operation of the HIGH-LOW switching mechanism), unusual sound (gear squeaking) may be generated from the switching sleeve.

The disclosure provides a power transmission system, and a control method of a power transmission system, which favorably suppress unusual sound generated from a switching sleeve during switching operation of a HIGH-LOW switching mechanism while the vehicle is stopped.

A first aspect of the disclosure is concerned with a power transmission system. The power transmission system includes a transfer case, an electric motor, and an electronic control unit. The transfer case includes an input shaft configured to receive power from a drive source, an output shaft configured to transmit power to main drive wheels and sub drive wheels, a planetary gear device including a first rotary element, a second rotary element, and a third rotary element, and a HIGH-LOW switching mechanism including a switching sleeve that selectively couples the output shaft to the first rotary element and the second rotary element. The first rotary element is coupled to the input shaft and configured to selectively couple to the output shaft. The second rotary element is configured to selectively couple to the output shaft. The third rotary element is coupled to a non-rotary member. The electric motor is coupled to one of the first rotary element and the second rotary element. The electronic control unit is configured to control a rotational speed of the electric motor, during switching operation of the HIGH-LOW switching mechanism while the vehicle is stopped, such that a rotational speed of the input shaft becomes equal to zero.

With the first aspect, the rotational speed of the electric motor is controlled by the electronic control unit so that the rotational speed of the input shaft becomes equal to zero, during switching operation of the HIGH-LOW switching mechanism while the vehicle is stopped, and the rotational speed of the input shaft, namely, the rotational speed of the first rotary element and the second rotary element, are prevented from increasing during switching operation of the HIGH-LOW switching mechanism. Therefore, unusual sound that would be generated from the switching sleeve when the rotational speed of the input shaft increases during switching operation of the HIGH-LOW switching mechanism while the vehicle is stopped is favorably suppressed.

In the first aspect, the electronic control unit may be configured to control, when the HIGH-LOW switching mechanism performs switching operation while the vehicle is traveling, the rotational speed of the electric motor, during the switching operation of the HIGH-LOW switching mechanism, such that one of a rotational speed of the first rotary element and a rotational speed of the second rotary element becomes equal to a rotational speed of the output shaft.

With the above configuration, the HIGH-LOW switching mechanism can perform switching operation even while the vehicle is traveling, and unusual sound generated from the switching sleeve during switching operation of the HIGH-LOW switching mechanism while the vehicle is traveling is favorably suppressed.

In the first aspect, the HIGH-LOW switching mechanism may be configured to change the rotational speed of the input shaft and transmit a rotation to the output shaft, through switching operation of the HIGH-LOW switching mechanism. The switching operation may be operation to switch the switching sleeve between a high-gear position and a low-gear position by using a shift actuator. The high-gear position may be a position in which the switching sleeve engages with HIGH-side gear teeth formed on the first rotary element, and the low-gear position may be a position in which the switching sleeve engages with LOW-side gear teeth formed on the second rotary element.

With the above configuration, unusual sound generated when the switching sleeve engages with the HIGH-side gear teeth or the LOW-side gear teeth during switching operation of the HIGH-LOW switching mechanism while the vehicle is stopped is favorably suppressed.

In the first aspect, the electronic control unit may be configured to control, when the switching sleeve is switched from the high-gear position to the low-gear position while the vehicle is traveling, the rotational speed of the electric motor, while the switching sleeve is in a neutral position in which the switching sleeve engages with neither the HIGH-side gear teeth nor the LOW-side gear teeth, such that the rotational speed of the second rotary element becomes equal to the rotational speed of the output shaft.

With the above configuration, during switching operation of the HIGH-LOW switching mechanism to switch the switching sleeve from the high-gear position to the low-gear position while the vehicle is traveling, unusual sound generated when the switching sleeve engages with the LOW-side gear teeth is favorably suppressed.

In the first aspect, the electronic control unit may be configured to control, when the switching sleeve is switched from the low-gear position to the high-gear position while the vehicle is traveling, the rotational speed of the electric motor, while the switching sleeve is in a neutral position in which the switching sleeve engages with neither the HIGH-side gear teeth nor the LOW-side gear teeth, such that the rotational speed of the first rotary element becomes equal to the rotational speed of the output shaft.

With the above configuration, during switching operation of the HIGH-LOW switching mechanism to switch the switching sleeve from the low-gear position to the high-gear position while the vehicle is traveling, unusual sound generated when the switching sleeve engages with the HIGH-side gear teeth is favorably suppressed.

A second aspect of the disclosure is concerned with a control method of a power transmission system. The power transmission system includes a transfer case, an electric motor, and an electronic control unit. The transfer case includes an input shaft configured to receive power from a drive source, an output shaft configured to transmit power to main drive wheels and sub drive wheels, a planetary gear device including a first rotary element, a second rotary element, and a third rotary element, and a HIGH-LOW switching mechanism including a switching sleeve that selectively couples the output shaft to the first rotary element and the second rotary element. The first rotary element is coupled to the input shaft and configured to selectively couple to the output shaft. The second rotary element is configured to selectively couple to the output shaft. The third rotary element is coupled to a non-rotary member. The electric motor is coupled to one of the first rotary element and the second rotary element. The control method includes switching the HIGH-LOW switching mechanism by the electronic control unit, and controlling a rotational speed of the electric motor by the electronic control unit, during switching operation of the HIGH-LOW switching mechanism while the vehicle is stopped, such that a rotational speed of the input shaft becomes equal to zero.

With the second aspect, the rotational speed of the electric motor is controlled by the electronic control unit so that the rotational speed of the input shaft becomes equal to zero, during switching operation of the HIGH-LOW switching mechanism while the vehicle is stopped, and the rotational speed of the input shaft, namely, the rotational speeds of the first rotary element and the second rotary element, are prevented from increasing during switching operation of the HIGH-LOW switching mechanism. Therefore, unusual sound that would be generated from the switching sleeve when the rotational speed of the input shaft increases during switching operation of the HIGH-LOW switching mechanism while the vehicle is stopped is favorably suppressed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 15 is a flowchart illustrating one example of control operation of switching control of the HIGH-LOW switching mechanism to switch the HIGH-LOW switching sleeve from the high-gear position to the low-gear position or from the low-gear position to the high-gear position while the vehicle is stopped or the vehicle is traveling, in the electronic control unit of FIG. 10;

DETAILED DESCRIPTION OF EMBODIMENTS

A first embodiment of the disclosure will be described in detail with reference to the drawings.

Figure 1:
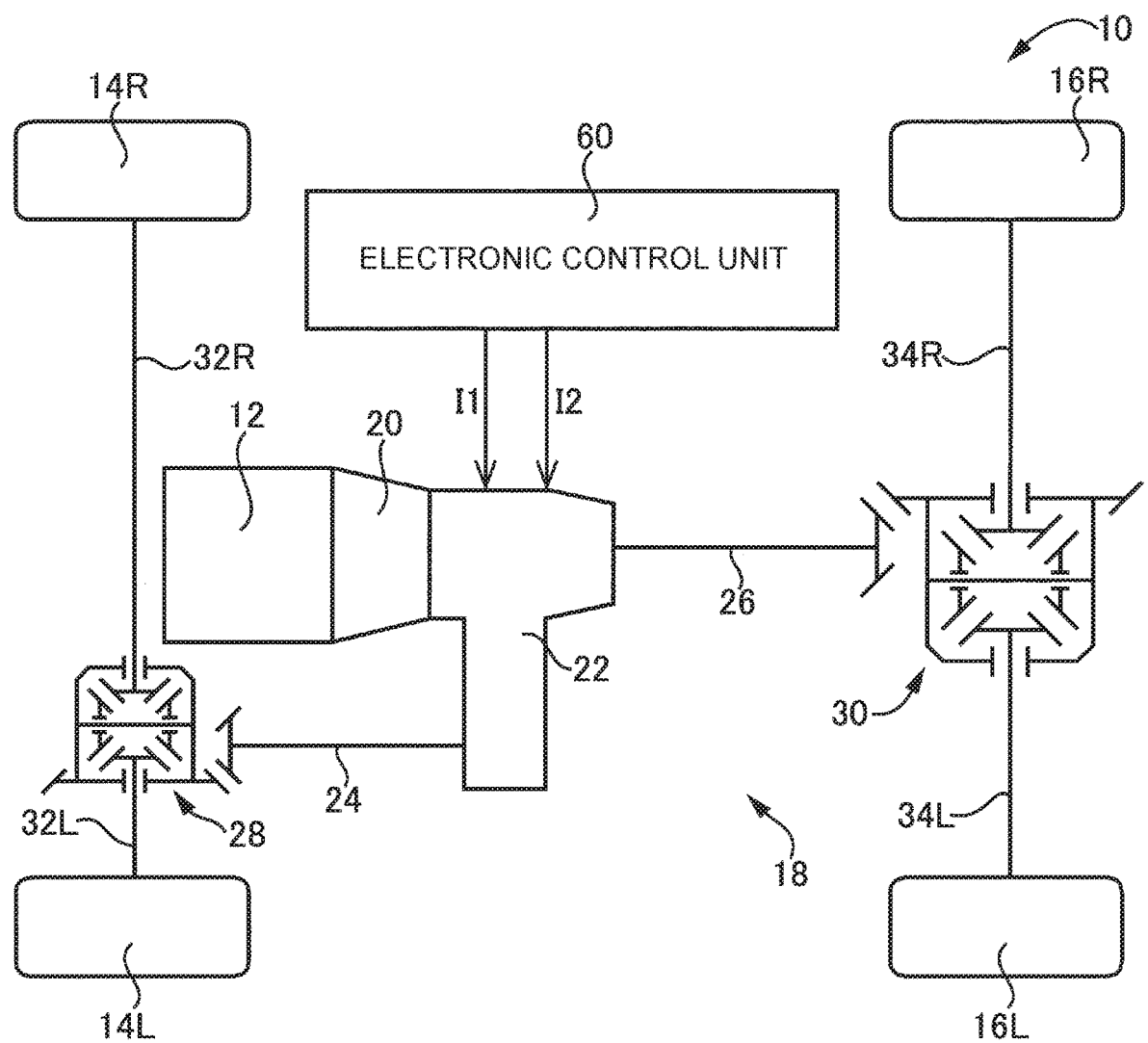
FIG. 1 is a view illustrating the general configuration of a four-wheel drive vehicle.

FIG. 1 shows the general configuration of a vehicle 10 to which the disclosure is applied, and also shows a principal part of a control system for various controls performed in the vehicle 10. In FIG. 1, the vehicle 10 includes an engine 12 as a drive source, right and left front wheels 14R, 14L (which will be referred to as "front wheels 14" when they are not particularly distinguished from each other), right and left rear wheels 16R, 16L (which will be referred to as "rear wheels 16" when they are not particularly distinguished from each other), a power transmission system 18 which transmits power from the engine 12 to the front wheels 14 and the rear wheels 16, and so forth. The rear wheels 16 are main drive wheels that serve as drive wheels when the vehicle 10 is traveling in a two-wheel drive (2WD) mode and a four-wheel drive (4WD) mode. The front wheels 14 are sub drive wheels that serve as driven wheels when the vehicle 10 is traveling in the 2WD mode, and serve as drive wheels when the vehicle 10 is traveling in the 4WD mode. The vehicle 10 is a four-wheel drive vehicle based on a front-engine rear-drive (FR) vehicle.

As shown in FIG. 1, the power transmission system 18 includes an automatic transmission 20 coupled to the engine 12, a transfer case 22 coupled to the automatic transmission 20, front propeller shaft 24 and rear propeller shaft 26 respectively coupled to the transfer case 22, a front-wheel differential gear device 28 coupled to the front propeller shaft 24, and a rear-wheel differential gear device 30 coupled to the rear propeller shaft 26. The power transmission system 18 also includes right and left front-wheel axles 32R, 32L (which will be referred to as "front-wheel axles 32" when they are not distinguished from each other) coupled to the front-wheel differential gear device 28, right and left rear-wheel axles 34R, 34L (which will be referred to as "rear-wheel axles 34" when they are not distinguished from each other) coupled to the rear-wheel differential gear device 30, and so forth. In the power transmission system 18 thus constructed, power of the engine 12 transmitted to the transfer case 22 via the automatic transmission 20 is transmitted from the transfer case 22 to the rear wheels 16, via a power transmission path on the rear wheels 16 side, namely, passing through the rear propeller shaft 26, rear-wheel differential gear device 30, rear-wheel axles 34, etc. in this order. Also, a part of the power of the engine 12 transmitted to the rear wheels 16 side is distributed to the front wheels 14 side in the transfer case 22, and is transmitted to the front wheels 14, via a power transmission path on the front wheels 14 side, namely, passing through the front propeller shaft 24, front-wheel differential gear device 28, front-wheel axles 32, etc. in this order.

The automatic transmission 20 is a multi-speed automatic transmission including two or more planetary gear devices and friction engagement devices (e.g., wet multiple disc clutches, and brakes). The automatic transmission 20 is placed in a selected one of gear positions, by selectively engaging the friction engagement devices.

Figure 2:
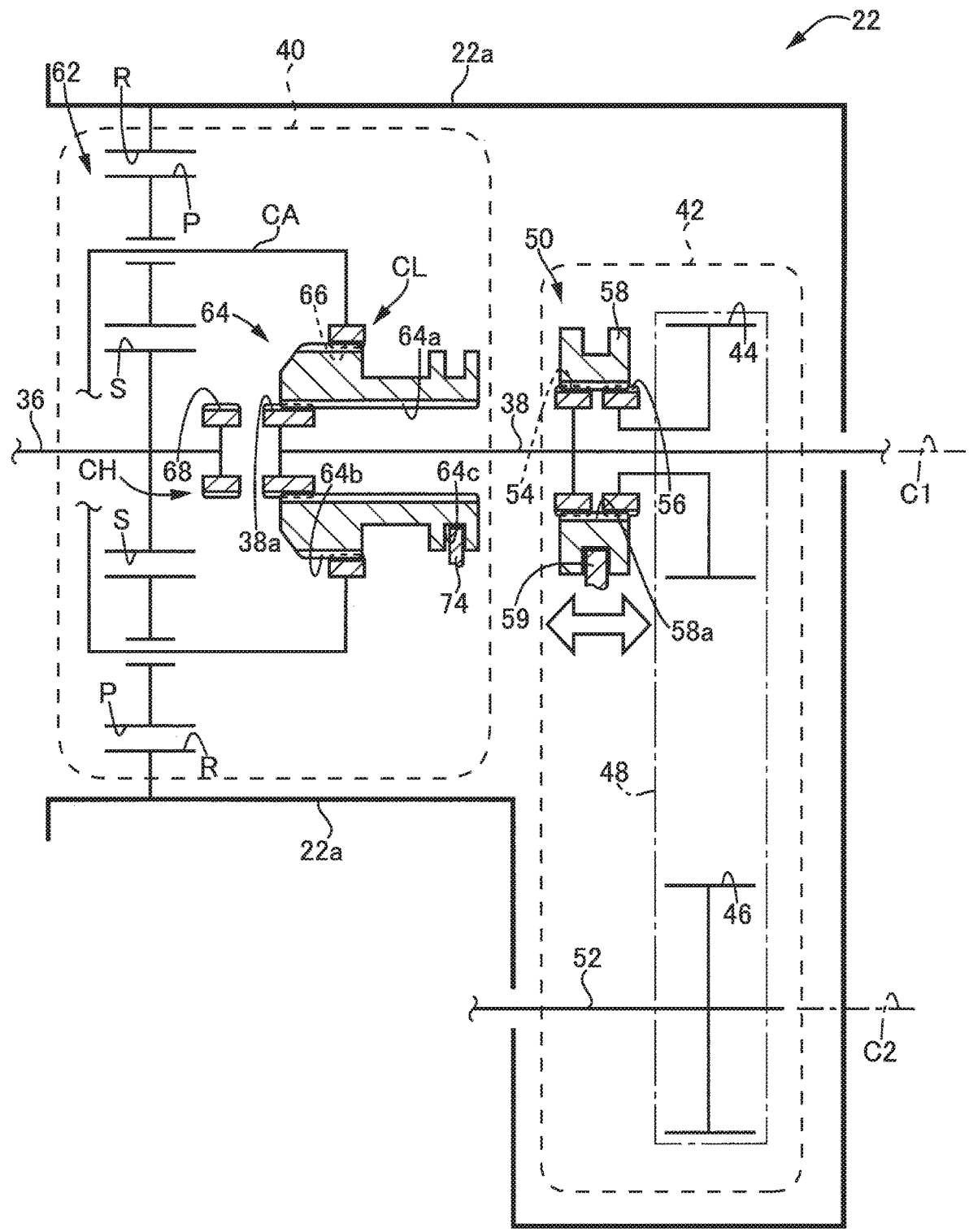
FIG. 2 is a view illustrating the configuration of a transfer case provided in the four-wheel drive vehicle of FIG. 1.

FIG. 2 shows the general configuration of the transfer case 22. As shown in FIG. 2, the transfer case 22 includes a transfer housing 22a as a non-rotary member. The transfer case 22 includes an input shaft 36 configured to receive power from the engine 12, an output shaft 38 that transmits power to the front wheels 14 and the rear wheels 16, a HIGH-LOW switching mechanism 40, a power distribution mechanism 42, and so forth. The HIGH-LOW switching mechanism 40 changes the speed of rotation of the input shaft 36, and transmits the resulting rotation to the output shaft 38. The power distribution mechanism 42 distributes the power transmitted to the output shaft 38, to the front propeller shaft 24, namely, to the front wheels 14. The input shaft 36 is integrally coupled to an output shaft (not shown) of the automatic transmission 20, and the output shaft 38 is integrally coupled to the rear propeller shaft 26.

As shown in FIG. 2, the power distribution mechanism 42 includes a drive gear 44 in the form of a sprocket, a driven gear 46 in the form of a sprocket, a front-wheel drive chain 48 looped around the drive gear 44 and the driven gear 46, and a dog clutch 50 that integrally couples the output shaft 38 with the drive gear 44. The drive gear 44 is supported such that it can rotate about the rotation axis of the output shaft 38, which is denoted as a first rotation axis C1. The driven gear 46 is supported such that it can rotate about a second rotation axis C2 parallel to the first rotation axis C1. The rotation axis of the input shaft 36 coincides with the first rotation axis C1. The driven gear 46 is integrally formed with a front-wheel-side output shaft 52 that rotates about the second rotation axis C2, and the front-wheel-side output shaft 52 is integrally coupled to the front propeller shaft 24.

The dog clutch 50 is operable to selectively connect and disconnect the rear propeller shaft 26 coupled to the output shaft 38 to and from the front propeller shaft 24 coupled to the front-wheel-side output shaft 52. Namely, the dog clutch 50 is operable to selectively switch the vehicle 10 between two-wheel drive traveling and four-wheel drive traveling. As shown in FIG. 2, the dog clutch 50 includes first clutch teeth 54 integrally provided on the output shaft 38, second clutch teeth 56 integrally provided on the drive gear 44, a 4WD switching sleeve 58, a shift fork 59, and a 4WD switching actuator (not shown) that drives the shift fork 59. The 4WD switching sleeve 58 is formed with internal gear teeth 58a that can engage with the first clutch teeth 54 and the second clutch teeth 56, and is movable in the direction of the first rotation axis C1. The shift fork 59 is engaged with an outer circumferential groove of the 4WD switching sleeve 58, such that it can rotate relative to the sleeve 58, and is operable to move the 4WD switching sleeve 58 in the direction of the first rotation axis C1.

In the power distribution mechanism 42 constructed as described above, when the 4WD switching actuator (not shown) is driven by an electronic control unit (rotation controller) 60 that will be described later, for example, so that the 4WD switching sleeve 58 is moved in the direction of the first rotation axis C1 to a position at which the internal gear teeth 58a of the 4WD switching sleeve 58 engage with the first clutch teeth 54 but do not engage with the second clutch teeth 56, the power distribution mechanism 42 is switched to a two-wheel drive state in which power of the engine 12 is transmitted only to the rear wheels 16. When the 4WD switching sleeve 58 is moved in the direction of the first rotation axis C1 to a position at which the internal gear teeth 58a of the 4WD switching sleeve 58 engage with the first clutch teeth 54 and the second clutch teeth 56, the power distribution mechanism 42 is switched to a four-wheel drive state in which power of the engine 12 is transmitted to the front wheels 14 and the rear wheels 16. The power distribution mechanism 42 may be provided with a synchronization mechanism that makes the rotational speed of the second clutch teeth 56 equal to the rotational speed of the first clutch teeth 54, namely, makes the rotational speed of the drive gear 44 with the rotational speed of the output shaft 38, in a process of moving the 4WD switching sleeve 58 in the direction of the first rotation axis C1 so that the internal gear teeth 58a of the 4WD switching sleeve 58 are brought into meshing engagement with the second clutch teeth 56, from a condition where the internal gear teeth 58a are engaged with the first clutch teeth 54, for example.

As shown in FIG. 2, the HIGH-LOW switching mechanism 40 includes a single-pinion type planetary gear device 62, and a HIGH-LOW switching sleeve (switching sleeve) 64. The single-pinion type planetary gear device 62 has a sun gear (first rotary element) S, a ring gear (third rotary element) R, and a carrier (second rotary element) CA. The sun gear S is coupled to the input shaft 36 such that it cannot rotate relative to the input shaft 36 about the first rotation axis C1. The ring gear R is disposed generally concentrically with the sun gear S, and is coupled to the transfer housing 22a as a non-rotary member such that it cannot rotate about the first rotation axis C1. The carrier CA supports a plurality of pinion gears P that mesh with the sun gear S and the ring gear R such that the pinion gears P can rotate about themselves and about the sun gear S. In the planetary gear device 62, the rotational speed of the sun gear S is equal to that of the input shaft 36, and the rotational speed of the carrier CA is reduced relative to that of the input shaft 36.

As shown in FIG. 2, the HIGH-LOW switching sleeve 64 is formed with inner spline teeth 64a and outer spline teeth 64b. The inner spline teeth 64a are fitted via splines to outer spline teeth 38a formed on the outer periphery of an axial end portion of the output shaft 38 closer to the planetary gear device 62, such that the HIGH-LOW switching sleeve 64 cannot rotate relative to the output shaft 38, and can move in the direction of the first rotation axis C1 relative to the output shaft 38. The outer spline teeth 64b can engage with LOW-side gear teeth 66 formed on the carrier CA. The LOW-side gear teeth 66 are inner spline teeth formed on the carrier CA, and the outer spline teeth 64b of the HIGH-LOW switching sleeve 64 are fitted via splines to the LOW-side gear teeth 66, such that the sleeve 64 cannot rotate relative to the carrier CA, and can move in the direction of the first rotation axis C1 relative to the carrier CA. The sun gear S is formed with HIGH-side gear teeth 68 that are outer spline teeth having the same diameter as the outer spline teeth 38a formed on the axial end portion of the output shaft 38 closer to the planetary gear device 62, for example. The inner spline teeth 64a of the HIGH-LOW switching sleeve 64 can be fitted via splines to the HIGH-side gear teeth 68 such that the sleeve 64 cannot rotate relative to the sun gear S, and can move in the first rotation axis C1 relative to the sun gear S.

Figure 3:
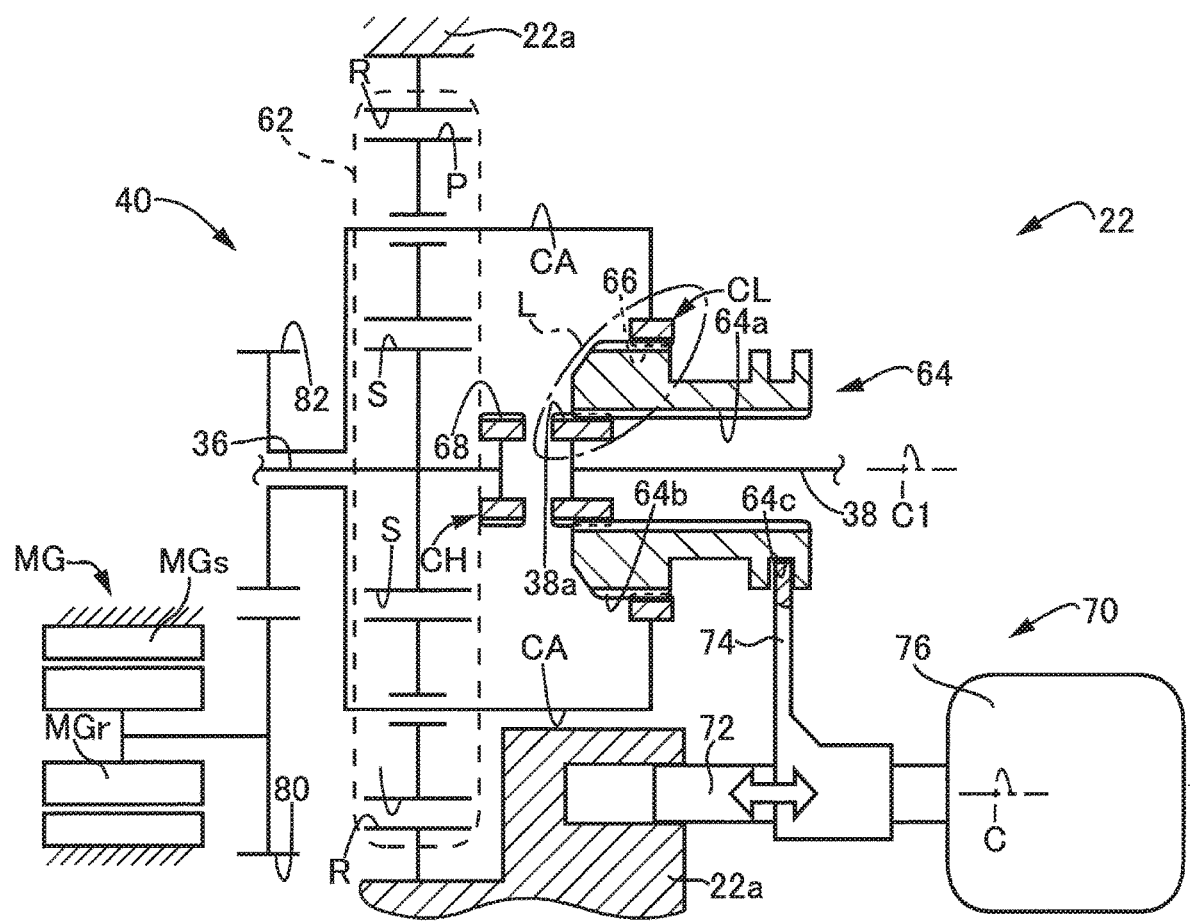
FIG. 3 is a view illustrating the configuration of a HIGH-LOW switching mechanism provided in the transfer case of FIG. 2, and showing a condition where a HIGH-LOW switching sleeve provided in the HIGH-LOW switching mechanism is in a low-gear position.
Figure 4:
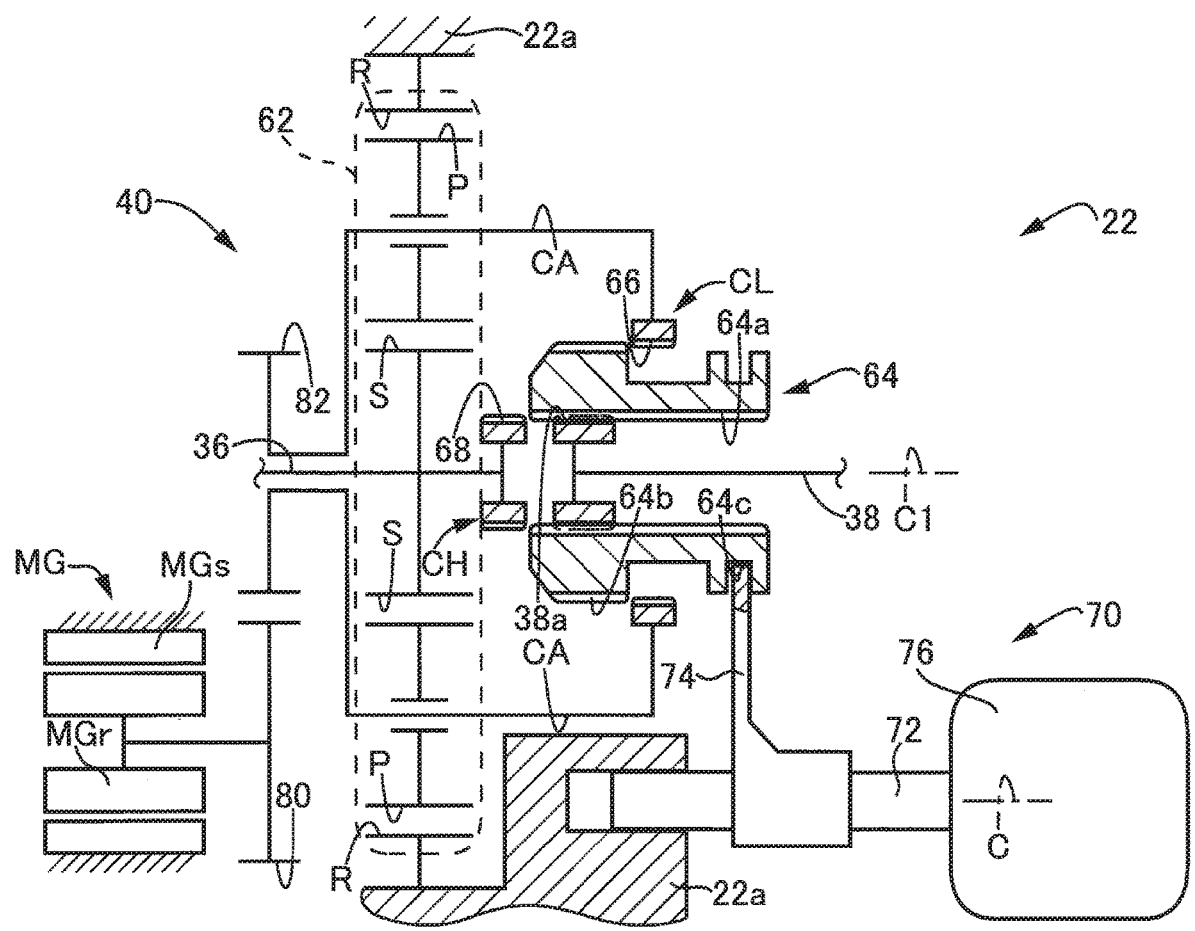
FIG. 4 is a view illustrating the configuration of the HIGH-LOW switching mechanism provided in the transfer case of FIG. 2, and showing a condition where the HIGH-LOW switching sleeve provided in the HIGH-LOW switching mechanism is in a neutral position.
Figure 5:
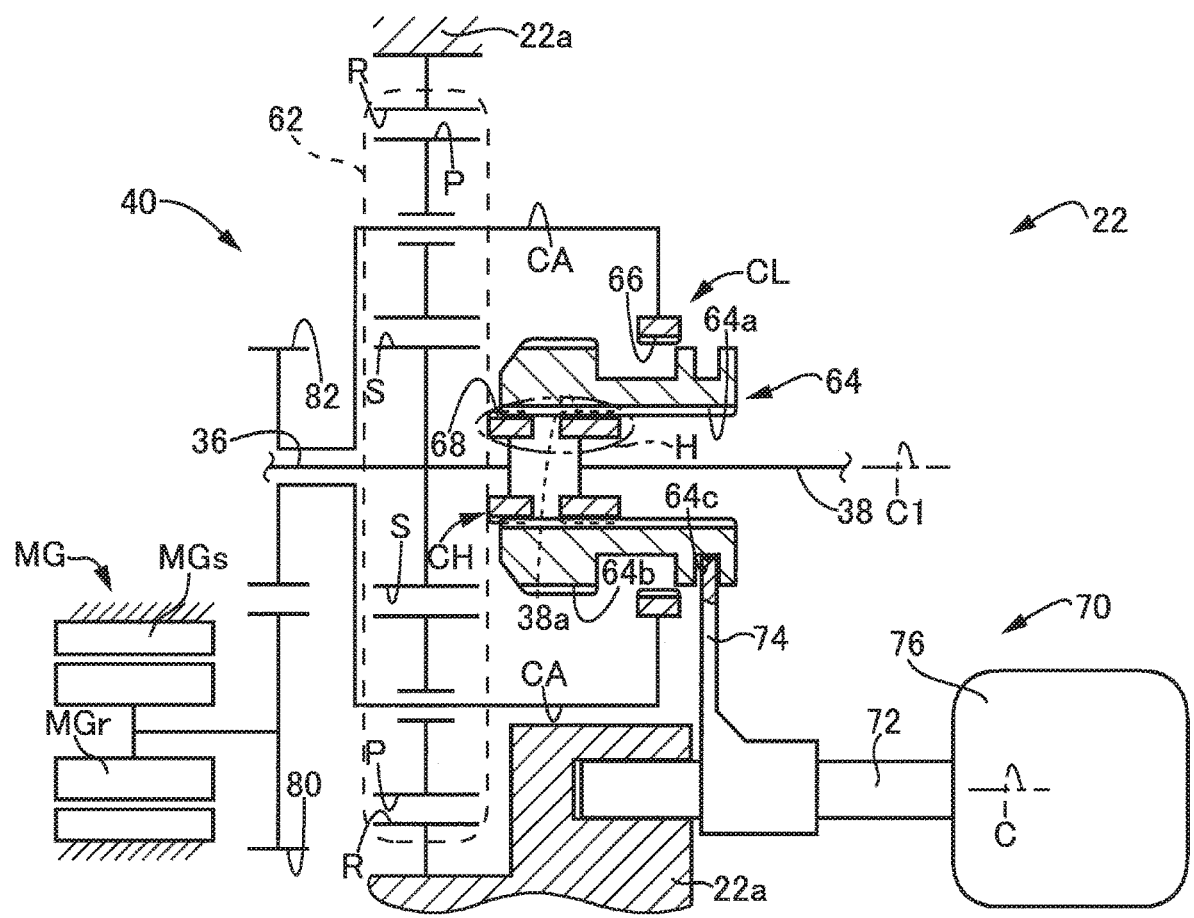
FIG. 5 is a view illustrating the configuration of the HIGH-LOW switching mechanism provided in the transfer case of FIG. 2, and showing a condition where the HIGH-LOW switching sleeve provided in the HIGH-LOW switching mechanism is in a high-gear position.

As shown in FIG. 3 to FIG. 5, the HIGH-LOW switching mechanism 40 includes a HIGH-LOW switching actuator (shift actuator) 70 operable to move the HIGH-LOW switching sleeve 64 in the direction of the first rotation axis C1, to a high-gear position (see FIG. 5) and a low-gear position (see FIG. 3) for switching between these positions. In the high-gear position, the inner spline teeth 64a of the HIGH-LOW switching sleeve 64 engage with the outer spline teeth 38a of the output shaft 38, and the inner spline teeth 64a of the HIGH-LOW switching sleeve 64 engage with the HIGH-side gear teeth 68. In the low-gear position, the inner spline teeth 64a of the HIGH-LOW switching sleeve 64 engage with the outer spline teeth 38a of the output shaft 38, and the outer spline teeth 64b of the HIGH-LOW switching sleeve 64 engage with the LOW-side gear teeth 66. Namely, the HIGH-LOW switching sleeve 64 is switched to the high-gear position or the low-gear position, by using the HIGH-LOW switching actuator 70, so that the output shaft 38 is selectively coupled to the sun gear S formed with the HIGH-side gear teeth 68, and the carrier CA formed with the LOW-side gear teeth 66.

As shown in FIG. 3 to FIG. 5, the HIGH-LOW switching actuator 70 includes a fork shaft 72, a fork 74, and a fork shaft drive unit 76. The fork shaft 72 is provided in the transfer housing 22a such that it can move in a direction of axis C parallel to the first rotation axis C1. The fork 74 is integrally coupled to the fork shaft 72, and is coupled to a fork coupling portion 64c formed integrally in the HIGH-LOW switching sleeve 64. The fork shaft drive unit 76 is operable to drive the fork shaft 72 in the direction of axis C. Although not illustrated in the drawings, the fork shaft drive unit 76 includes an electric motor driven with first drive current I1 (see FIG. 6) supplied from the electronic control unit 60, for example, and a conversion mechanism, such as a screw mechanism, which converts rotary drive power of the electric motor, into drive power applied in the direction of axis C1. Thus, the electronic control unit 60 makes it possible to move the fork shaft 72 to a given position in the direction of axis C1.

With the HIGH-LOW switching mechanism 40 constructed as described above, when the HIGH-LOW switching sleeve 64 is switched to the high-gear position by using the HIGH-LOW switching actuator 70, as shown in FIG. 5, for example, the inner spline teeth 64a of the HIGH-LOW switching sleeve 64 are engaged with the HIGH-side gear teeth 68, and rotation having the same speed as that of the input shaft 36 is transmitted to the output shaft 38. The HIGH-side gear teeth 68 are spline teeth that deliver rotation having the same speed as that of the input shaft 36, to the output shaft 38, and are involved in establishment of a high-speed gear position H. Also, when the HIGH-LOW switching sleeve 64 is switched to the low-gear position by using the HIGH-LOW switching actuator 70, as shown in FIG. 3, for example, the outer spline teeth 64b of the HIGH-LOW switching sleeve 64 are engaged with the LOW-side gear teeth 66, and rotation having a reduced speed relative to that of the input shaft 36 is transmitted to the output shaft 38. The LOW-side gear teeth 66 are spline teeth that deliver rotation having a lower speed than that of the HIGH-side gear teeth 68, to the output shaft 38, and are involved in establishment of a low-speed gear position L. Namely, the HIGH-LOW switching mechanism 40 changes the speed of rotation of the input shaft 36, and transmits the resulting rotation to the output shaft 38, through switching operation of the HIGH-LOW switching mechanism 40 to switch the HIGH-LOW switching sleeve 64 between the high-gear position and the low-gear position by using the HIGH-LOW switching actuator 70. In the HIGH-LOW switching mechanism 40, the HIGH-LOW switching sleeve 64 is once placed in a neutral position at which the HIGH-LOW switching sleeve 64 engages with neither the HIGH-side gear teeth 68 nor the LOW-side gear teeth 66, as shown in FIG. 4, in the process of switching the HIGH-LOW switching sleeve 64 from the high-gear position to the low-gear position, or in the process of switching the HIGH-LOW switching sleeve 64 from the low-gear position to the high-gear position. Then, the HIGH-LOW switching sleeve 64 is switched to the high-gear position or the low-gear position.

In the HIGH-LOW switching mechanism 40, the HIGH-side gear teeth 68 and the inner spline teeth 64a of the HIGH-LOW switching sleeve 64 function as a clutch CH for high-speed gear position, which forms a high-speed gear position H in the HIGH-LOW switching mechanism 40, and the LOW-side gear teeth 66 and the outer spline teeth 64b of the HIGH-LOW switching sleeve 64 function as a clutch CL for low-speed gear position, which forms a low-speed gear position L in the HIGH-LOW switching mechanism 40. In the planetary gear device 62 provided in the HIGH-LOW switching mechanism 40, the sun gear S is selectively coupled to the output shaft 38, via the clutch CH for high-speed gear position, and the carrier CA is selectively coupled to the output shaft 38 via the clutch CL for low-speed gear position.

The power transmission system 18 includes an electric motor MG coupled to the carrier CA such that power is transmitted therebetween, as shown in FIG. 3 to FIG. 5. For example, the electric motor MG is in the form of a three-phase AC synchronous motor that consists principally of a stator MGs on which coils are wound, and a rotor MGr including permanent magnets. The electric motor MG functions as a so-called motor-generator that functions as a motor and a generator. A first gear 80 is coupled to the rotor MGr of the electric motor MG such that power is transmitted therebetween, and a second gear 82 that meshes with the first gear 80 is coupled to the carrier CA such that power is transmitted therebetween. The rotational speed Nmg of the rotor MGr of the electric motor MG is controlled with second drive current I2 (see FIG. 6) supplied from the electronic control unit 60, and the electronic control unit 60 functions as a rotation controller that controls the rotational speed Nmg of the electric motor MG.

Figure 6:
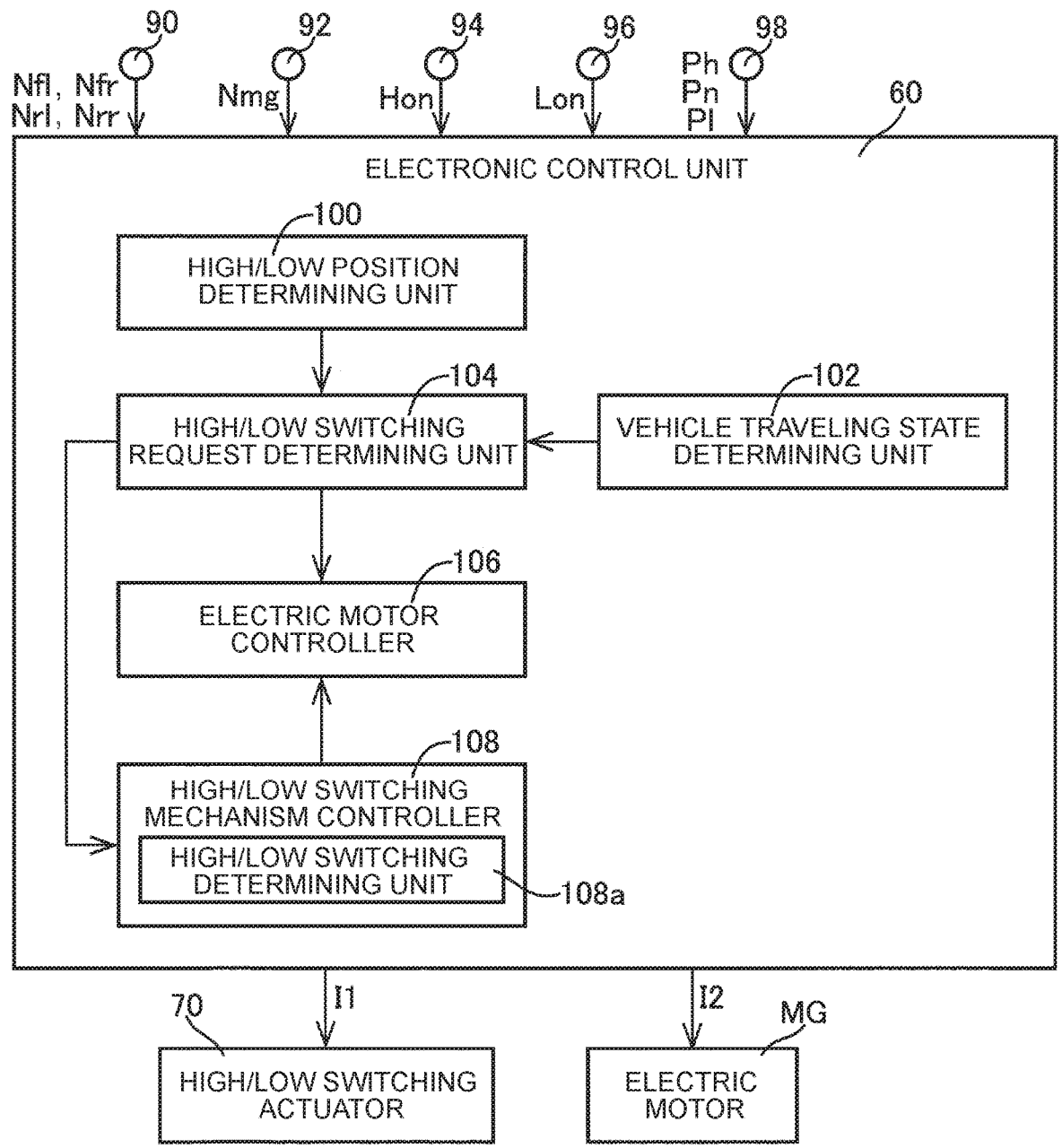
FIG. 6 is a functional block diagram illustrating a principal part of control functions included in an electronic control unit provided in the four-wheel drive vehicle of FIG. 1.

As shown in FIG. 1, various signals are supplied from respective sensors, switches, etc. as shown in FIG. 6, to the electronic control unit 60 included in the power transmission system 18. For example, the electronic control unit 60 receives signals indicative of the rotational speeds Nfl, Nfr, Nrl, Nrr (rpm) of the front wheels 14L, 14R and rear wheels 16L, 16R detected by wheel speed sensors 90, a signal indicative of the rotational speed Nmg (rpm) of the rotor MGr of the electric motor MG detected by a motor speed sensor 92, a high-gear request signal Hon as a signal indicating that a high-gear selection switch 94 has been operated by the driver, from the high-gear selection switch 94 that permits the driver to select the high-speed gear position H, and a low-gear request signal Lon as a signal indicating that a low-gear selection switch 96 has been operated by the driver, from the low-gear selection switch 96 that permits the driver to select the low-speed gear position L, for example. The electronic control unit 60 also receives a signal indicative of a position of the HIGH-LOW switching sleeve 64 detected by a position sensor 98, namely, a signal Ph indicating that the HIGH-LOW switching sleeve 64 is in the high-gear position, or a signal Pn indicating that the HIGH-LOW switching sleeve 64 is in the neutral position, or a signal P1 indicating that the HIGH-LOW switching sleeve 64 is in the low-gear position.

Various output signals are supplied from the electronic control unit 60, to respective devices provided in the vehicle 10. For example, the first drive current I1 supplied to the fork shaft drive unit 76 of the HIGH-LOW switching actuator 70 so as to switch the HIGH-LOW switching sleeve 64 to the high-gear position or the low-gear position, second drive current I2 supplied to the electric motor MG so as to control the rotational speed Nmg of the rotor MGr of the electric motor MG, etc., are supplied from the electronic control unit 60, to the corresponding parts.

A HIGH-LOW position determining unit 100 shown in FIG. 6 determines whether the HIGH-LOW switching sleeve 64 is in the high-gear position or the low-gear position in the HIGH-LOW switching mechanism 40. For example, the HIGH-LOW position determining unit 100 determines that the HIGH-LOW switching sleeve 64 is in the high-gear position when the position of the HIGH-LOW switching sleeve 64 is the high-gear position as represented by the signal Ph detected by the position sensor 98, and determines that the HIGH-LOW switching sleeve 64 is in the low-gear position when the position of the HIGH-LOW switching sleeve 64 is not the high-gear position.

A vehicle traveling state determining unit 102 determines whether the vehicle 10 is traveling or the vehicle 10 is stopped. For example, the vehicle traveling state determining unit 102 determines whether the vehicle 10 is traveling or is stopped, based on the rotational speeds Nfl, Nfr, Nrl, Nrr (rpm) of the front wheels 14L, 14R and the rear wheels 16L, 16R detected by the wheel speed sensors 90.

After the HIGH-LOW position determining unit 100 determines whether the HIGH-LOW switching sleeve 64 is in the high-gear positon or the low-gear position, a HIGH-LOW switching request determining unit 104 determines whether a request for switching the HIGH-LOW switching sleeve 64 from the high-gear position to the low-gear position has been made, or a request for switching the HIGH-LOW switching sleeve 64 from the low-gear position to the high-gear position has been made. For example, the HIGH-LOW switching request determining unit 104 determines that a request for switching the HIGH-LOW switching sleeve 64 from the high-gear position to the low-gear position has been made, when the HIGH-LOW position determining unit 100 determines that the HIGH-LOW switching sleeve 64 is in the high-gear position, and the low-gear selection switch 96 is operated by the driver, in the case where the vehicle traveling state determining unit 102 determines that the vehicle 10 is stopped. Also, for example, the HIGH-LOW switching request determining unit 104 determines that a request for switching the HIGH-LOW switching sleeve 64 from the low-gear position to the high-gear position has been made, when the HIGH-LOW position determining unit 100 determines that the HIGH-LOW switching sleeve 64 is in the low-gear position, and the high-gear selection switch 94 is operated by the driver, in the case where the vehicle traveling state determining unit 102 determines that the vehicle 10 is stopped.

When the HIGH-LOW switching request determining unit 104 determines that a request for switching the HIGH-LOW switching sleeve 64 from the high-gear position to the low-gear position, or a request for switching the HIGH-LOW switching sleeve 64 from the low-gear position to the high-gear position has been made, an electric motor controller 106 supplies the second drive current I2 from the electronic control unit 60 to the electric motor MG, so that given braking torque Ts (see FIG. 8B and FIG. 8C) is applied to the rotor MGr of the electric motor MG. In the automatic transmission 20 of this embodiment, while the vehicle 10 is stopped, a neutral position in which power from the engine 12 is not transmitted to the output shaft of the automatic transmission 20, or the input shaft 36, is established. However, dragging torque Th (see FIG. 7A, FIG. 7B, FIG. 7C, FIG. 7D, FIG. 8A, FIG. 8B, and FIG. 8C) that increases the rotational speed of the input shaft 36 even while the vehicle is stopped is applied to the input shaft 36, due to dragging of wet multiple disc clutches provided in the automatic transmission 20. The given braking torque Ts means torque applied in such a direction as to suppress (stop) rotation of the input shaft 36 that is apt to rotate due to the dragging torque Th. When the HIGH-LOW switching request determining unit 104 determines that no request for switching the HIGH-LOW switching sleeve 64 from the high-gear position to the low-gear position, or no request for switching the HIGH-LOW switching sleeve 64 from the low-gear position to the high-gear position has been made, the electric motor controller 106 stops supply of the second drive current I2 from the electronic control unit 60 to the electric motor MG, and brings the electric motor MG into a non-driven state.

When the HIGH-LOW switching request determining unit 104 determines that a request for switching the HIGH-LOW switching sleeve 64 from the high-gear position to the low-gear position, or a request for switching the HIGH-LOW switching sleeve 64 from the low-gear position to the high-gear position has been made, and the electric motor controller 106 causes the second drive current I2 to be supplied from the electronic control unit 60 to the electric motor MG so that the given braking torque Ts is applied to the rotor MGr of the electric motor MG, the HIGH-LOW switching mechanism controller 108 causes the first drive current I1 to be supplied from the electronic control unit 60 to the fork shaft drive unit 76 of the HIGH-LOW switching actuator 70, so that the HIGH-LOW switching sleeve 64 moves in the direction of the first rotation axis C1, according to the switching request of the HIGH-LOW switching sleeve 64 determined by the HIGH-LOW switching request determining unit 104. For example, when the HIGH-LOW switching request determining unit 104 determines that a request for switching the HIGH-LOW switching sleeve 64 from the high-gear position to the low-gear position has been made, the HIGH-LOW switching mechanism controller 108 causes the first drive current I1 to be supplied from the electronic control unit 60 to the fork shaft drive unit 76, so that the HIGH-LOW switching sleeve 64 is switched from the high-gear position to the low-gear position, namely, the inner spline teeth 64a of the HIGH-LOW switching sleeve 64 move away from the HIGH-side gear teeth 68. Also, for example, when the HIGH-LOW switching request determining unit 104 determines that a request for switching the HIGH-LOW switching sleeve 64 from the low-gear position to the high-gear position has been made, the HIGH-LOW switching mechanism controller 108 causes the first drive current I1 to be supplied from the electronic control unit 60 to the fork shaft drive unit 76, so that the HIGH-LOW switching sleeve 64 is switched from the low-gear position to the high-gear position, namely, the outer spline teeth 64b of the HIGH-LOW switching sleeve 64 move away from the LOW-side gear teeth 66.

Once the HIGH-LOW switching mechanism controller 108 causes the first drive current I1 to be supplied from the electronic control unit 60 to the fork shaft drive unit 76 of the HIGH-LOW switching actuator 70, the HIGH-LOW switching determining unit 108a provided in the HIGH-LOW switching mechanism controller 108 determines whether the HIGH-LOW switching sleeve 64 is being switched from the high-gear position to the low-gear position, or from the low-gear position to the high-gear position, namely, whether the HIGH-LOW switching mechanism 40 is in the middle of switching operation. For example, when the HIGH-LOW switching request determining unit 104 determines that a request for switching the HIGH-LOW switching sleeve 64 from the high-gear position to the low-gear position has been made, the HIGH-LOW switching determining unit 108a determines that the HIGH-LOW switching mechanism 40 is in the middle of switching operation, during a period from the time when the first drive current I1 is supplied from the electronic control unit 60 to the fork shaft drive unit 76 of the HIGH-LOW switching actuator 70, to the time when the signal Pl detected by the position sensor 98 indicates that the HIGH-LOW switching sleeve 64 is placed in the low-gear position. Also, for example, when the HIGH-LOW switching request determining unit 104 determines that a request for switching the HIGH-LOW switching sleeve 64 from the low-gear position to the high-gear position has been made, the HIGH-LOW switching determining unit 108a determines that the HIGH-LOW switching mechanism 40 is in the middle of switching operation, during a period from the time when the first drive current I1 is supplied from the electronic control unit 60 to the fork shaft drive unit 76 of the HIGH-LOW switching actuator 70, to the time when the signal Ph detected by the position sensor 98 indicates that the HIGH-LOW switching sleeve 64 is placed in the high-gear position.

The electric motor controller 106 causes the second drive current I2 to be supplied from the electronic control unit 60 to the electric motor MG, so that given braking torque Ts is applied to the rotor MGr of the electric motor MG, as described above. When the HIGH-LOW switching determining unit 108a determines that the HIGH-LOW switching mechanism 40 is in the middle of switching operation, and that the rotational speed of the input shaft 36 becomes higher than zero, the electric motor controller 106 controls the rotational speed Nmg of the rotor MGr of the electric motor MG, so that the rotational speed of the input shaft 36 becomes equal to zero or close to zero. For example, when the HIGH-LOW switching determining unit 108a determines that the HIGH-LOW switching mechanism 40 is in the middle of switching operation, and that the rotational speed of the input shaft 36 becomes higher than zero, the electric motor controller 106 supplies the second drive current I2 from the electronic control unit 60 to the electric motor MG in the reverse direction, or applies a brake to the electric motor MG for electric power generation, so that the rotational speed of the input shaft 36 becomes equal to zero, namely, braking torque Ts larger than the given braking torque Ts that has been applied to the rotor MGr of the electric motor MG is applied to the rotor MGr of the electric motor MG. The rotational speed of the input shaft 36 is calculated from the rotational speed Nmg of the rotor MGr of the electric motor MG detected by the motor speed sensor 92. When the HIGH-LOW switching determining unit 108a determines that the HIGH-LOW switching mechanism 40 is not in the middle of switching operation, namely, determines that the HIGH-LOW switching sleeve 64 has been switched to the high-gear position or the low-gear position, the electric motor controller 106 stops supply of the second drive current I2 that has been supplied from the electronic control unit 60 to the electric motor MG, and brings the electric motor MG into a non-driven state.

FIG. 7A, FIG. 7B, FIG. 7C, FIG. 7D, FIG. 8A, FIG. 8B and FIG. 8C show nomographic charts indicating the relationships, on straight lines, of the rotational speeds of the respective rotary elements that are coupled in different manners depending on an engagement state of each of the clutch CH for high-speed gear position and the clutch CL for low-speed gear position, in the power transmission system 18 including the planetary gear device 62. In the nomographic charts of FIG. 7A, FIG. 7B, FIG. 7C, FIG. 7D, FIG. 8A, FIG. 8B and FIG. 8C, each rotational speed is denoted such that the rotational direction of the input shaft 36 when the vehicle travels forward is regarded as positive direction (positive rotation). In FIG. 7A to FIG. 8C, the horizontal line X1 indicated by a broken line indicates that the rotational speed is equal to zero. Among vertical lines Y1 to Y4 indicated by solid lines, the vertical line Y1 denotes the rotational speed of the sun gear S of the planetary gear device 62, or the rotational speed of the input shaft 36, and the vertical line Y2 denotes the rotational speed of the carrier CA of the planetary gear device 62, while the vertical line Y3 denotes the rotational speed of the ring gear R of the planetary gear device 62, and the vertical line Y4 denotes the rotational speed of the output shaft 38.

Figure 7A:
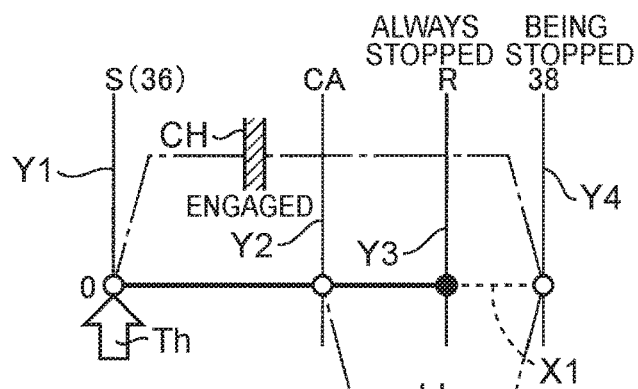
FIG. 7A is a nomographic chart showing a condition at the time when the HIGH-LOW switching sleeve is switched from the high-gear position to the low-gear position while the vehicle is stopped, and showing the case where an electric motor is in a non-driven state when the HIGH-LOW switching sleeve is switched from the high-gear position to the low-gear position.
Figure 7B:
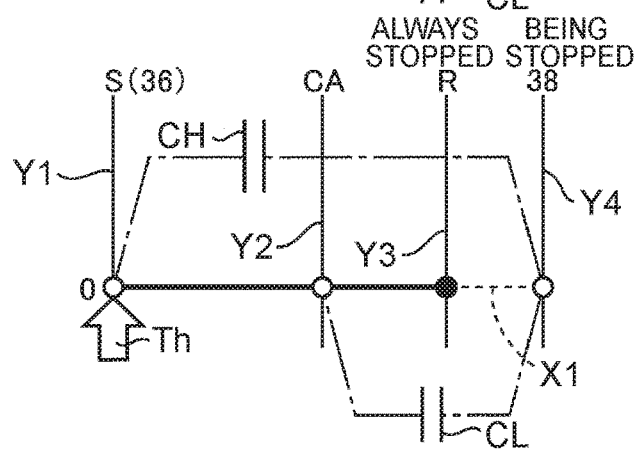
FIG. 7B is a nomographic chart showing a condition at the time when the HIGH-LOW switching sleeve is switched from the high-gear position to the low-gear position while the vehicle is stopped, and showing the case where the electric motor is in the non-driven state when the HIGH-LOW switching sleeve is switched from the high-gear position to the low-gear position.
Figure 7C:
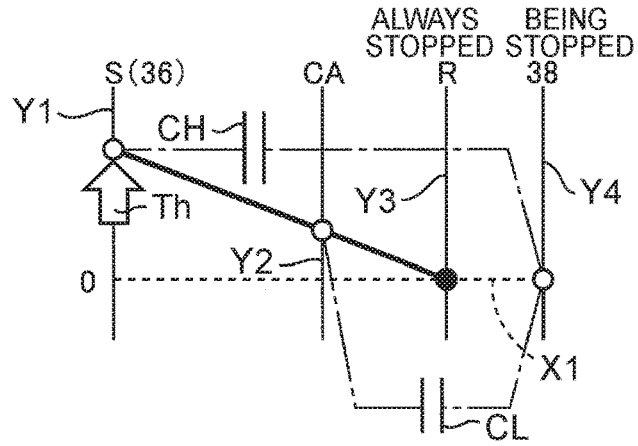
FIG. 7C is a nomographic chart showing a condition at the time when the HIGH-LOW switching sleeve is switched from the high-gear position to the low-gear position while the vehicle is stopped, and showing the case where the electric motor is in the non-driven state when the HIGH-LOW switching sleeve is switched from the high-gear position to the low-gear position.
Figure 7D:
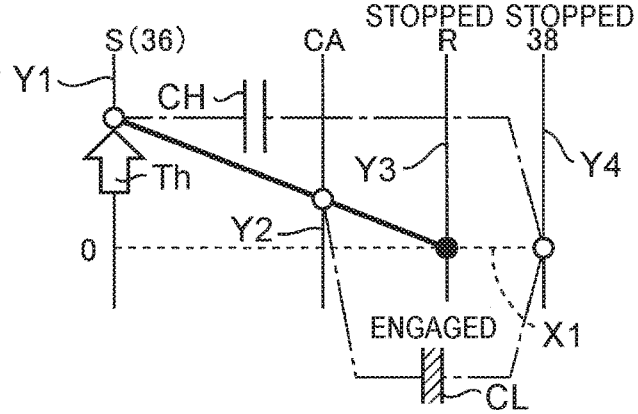
FIG. 7D is a nomographic chart showing a condition at the time when the HIGH-LOW switching sleeve is switched from the high-gear position to the low-gear position while the vehicle is stopped, and showing the case where the electric motor is in the non-driven state when the HIGH-LOW switching sleeve is switched from the high-gear position to the low-gear position.

The nomographic charts of the planetary gear device 62 shown in FIG. 7A, FIG. 7B, FIG. 7C, and FIG. 7D illustrate the case where the HIGH-LOW switching sleeve 64 is switched from the high-gear position in which the clutch CH for high-speed gear position is engaged, to the low-gear position in which the clutch CL for low-speed gear position is engaged, while the vehicle is stopped. FIG. 7A, FIG. 7B, FIG. 7C, and FIG. 7D show conditions where the electric motor MG is in a non-drive state, namely, the electric motor MG is not controlled by the electric motor controller 106 of the electronic control unit 60, in the process of switching the HIGH-LOW switching sleeve 64 from the high-gear position to the low-gear position. As shown in FIG. 7A, when the HIGH-LOW switching sleeve 64 is in the high-gear position, the input shaft 36 is not rotated though the dragging torque Th is applied to the sun gear S, or the input shaft 36, because the clutch CH for high-speed gear position is engaged, so that the output shaft 38 of which rotation is stopped while the vehicle is stopped is coupled to the input shaft 36 via the clutch CH for high-speed gear position such that power is transmitted therebetween. However, when the HIGH-LOW switching sleeve 64 is once switched from the high-gear position to the neutral position, and the clutch CH for high-speed gear position is released, as shown in FIG. 7B, the rotational speeds of the input shaft 36 and the carrier CA increase from zero, due to the dragging torque Th, as shown in FIG. 7C. As a result, when the HIGH-LOW switching sleeve 64 is switched from the neutral position to the low-gear position, and the carrier CA of which the rotational speed has increased from zero and the output shaft 38 of which the rotational speed is equal to zero are coupled so that power is transmitted therebetween, through engagement of the clutch CL for low-speed gear position, as shown in FIG. 7D, unusual sound (gear squeaking) arises from the outer spline teeth 64b of the HIGH-LOW switching sleeve 64 and the LOW-side gear teeth 66.

Figure 8A:
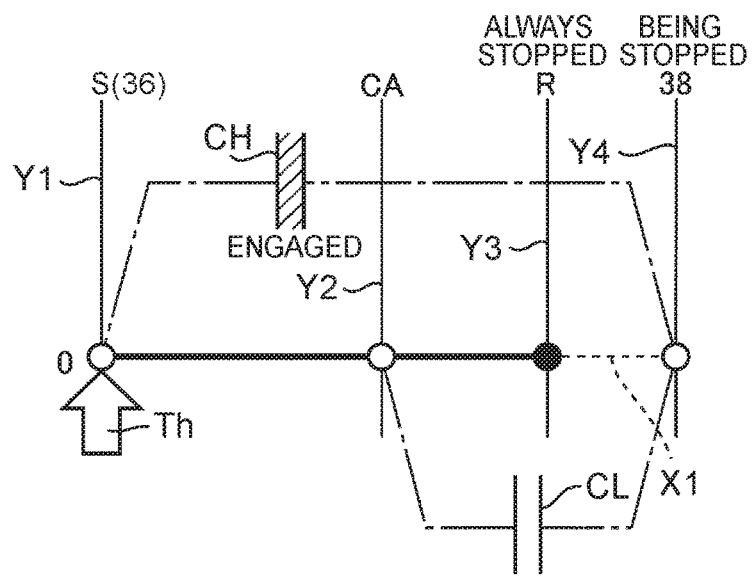
FIG. 8A is a nomographic chart showing a condition at the time when the HIGH-LOW switching sleeve is switched from the high-gear position to the low-gear position while the vehicle is stopped, and showing the case where the electric motor is controlled by an electric motor controller of the electronic control unit shown in FIG. 6 when the HIGH-LOW switching sleeve is switched from the high-gear position to the low-gear position.
Figure 8B:
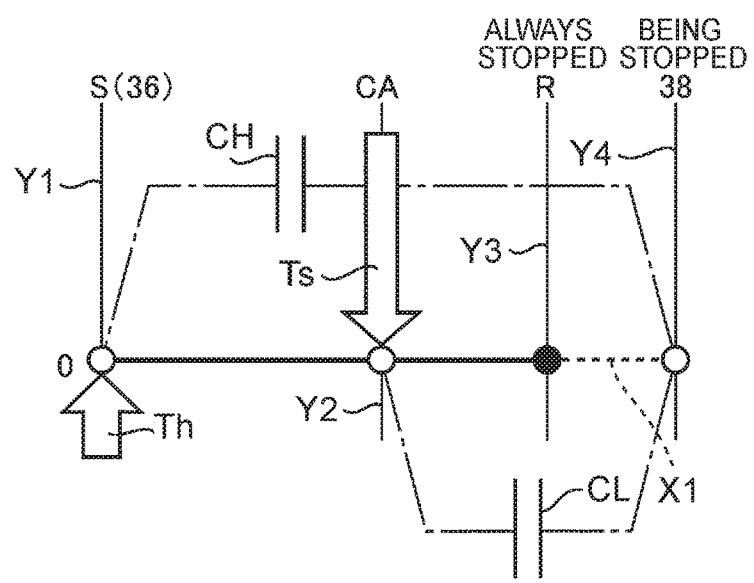
FIG. 8B is a nomographic chart showing a condition at the time when the HIGH-LOW switching sleeve is switched from the high-gear position to the low-gear position while the vehicle is stopped, and showing the case where the electric motor is controlled by the electric motor controller of the electronic control unit shown in FIG. 6 when the HIGH-LOW switching sleeve is switched from the high-gear position to the low-gear position.
Figure 8C:
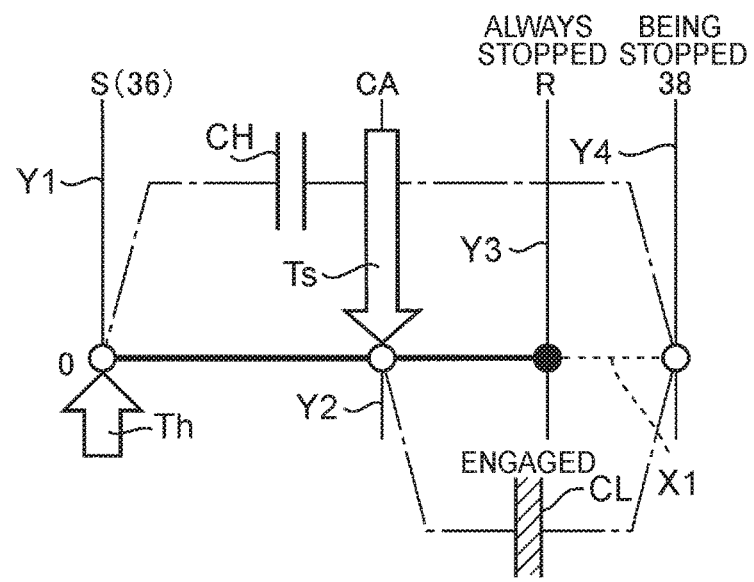
FIG. 8C is a nomographic chart showing a condition at the time when the HIGH-LOW switching sleeve is switched from the high-gear position to the low-gear position while the vehicle is stopped, and showing the case where the electric motor is controlled by the electric motor controller of the electronic control unit shown in FIG. 6 when the HIGH-LOW switching sleeve is switched from the high-gear position to the low-gear position.

The nomographic charts of the planetary gear device 62 shown in FIG. 8A, FIG. 8B, and FIG. 8C illustrate the case where the HIGH-LOW switching sleeve 64 is switched from the high-gear position in which the clutch CH for high-speed gear position is engaged, to the low-gear position in which the clutch CL for low-speed gear position is engaged, while the vehicle is stopped. FIG. 8A, FIG. 8B, and FIG. 8C show conditions where the rotor MGr of the electric motor MG is controlled by the electric motor controller 106 of the electronic control unit 60, in the process of switching the HIGH-LOW switching sleeve 64 from the high-gear position to the low-gear position. As shown in FIG. 8A, when the HIGH-LOW switching sleeve 64 is in the high-gear position, the input shaft 36 is not rotated though the dragging torque Th is applied to the sun gear S, or the input shaft 36, because the clutch CH for high-speed gear position is engaged, so that the output shaft 38 of which rotation is stopped while the vehicle is stopped is coupled to the input shaft 36 via the clutch CH for high-speed gear position such that power is transmitted therebetween. Then, as shown in FIG. 8B, during switching operation of the HIGH-LOW switching mechanism 40 to switch the HIGH-LOW switching sleeve 64 from the high-gear position to the low-gear position, the given braking torque Ts is applied to the rotor MGr of the electric motor MG, in such a direction as to suppress rotation of the input shaft 36 that is apt to rotate due to the dragging torque Th. Therefore, even when the HIGH-LOW switching sleeve 64 is once switched to the neutral position, and the clutch CH for high-speed gear position is released, the rotational speed of the input shaft 36 does not increase from zero. If the rotational speed of the input shaft 36 increases from zero, in a condition where the given braking torque Ts is applied to the rotor MGr of the electric motor MG, the electric motor MG is controlled, so that braking torque Ts that is larger than the given braking torque Ts is applied to the rotor MGr of the electric motor MG, namely, the rotational speed of the input shaft 36 becomes equal to zero. Therefore, even when the HIGH-LOW switching sleeve 64 is switched from the neutral position to the low-gear position, as shown in FIG. 8C, the rotational speed of the input shaft 36 is prevented from increasing from zero, owing to the braking torque Ts applied to the rotor MGr of the electric motor MG. Consequently, unusual sound (gear squeaking) that would arise from the outer spline teeth 64b of the HIGH-LOW switching sleeve 64 and the LOW-side gear teeth 66 is favorably suppressed.

Figure 9:
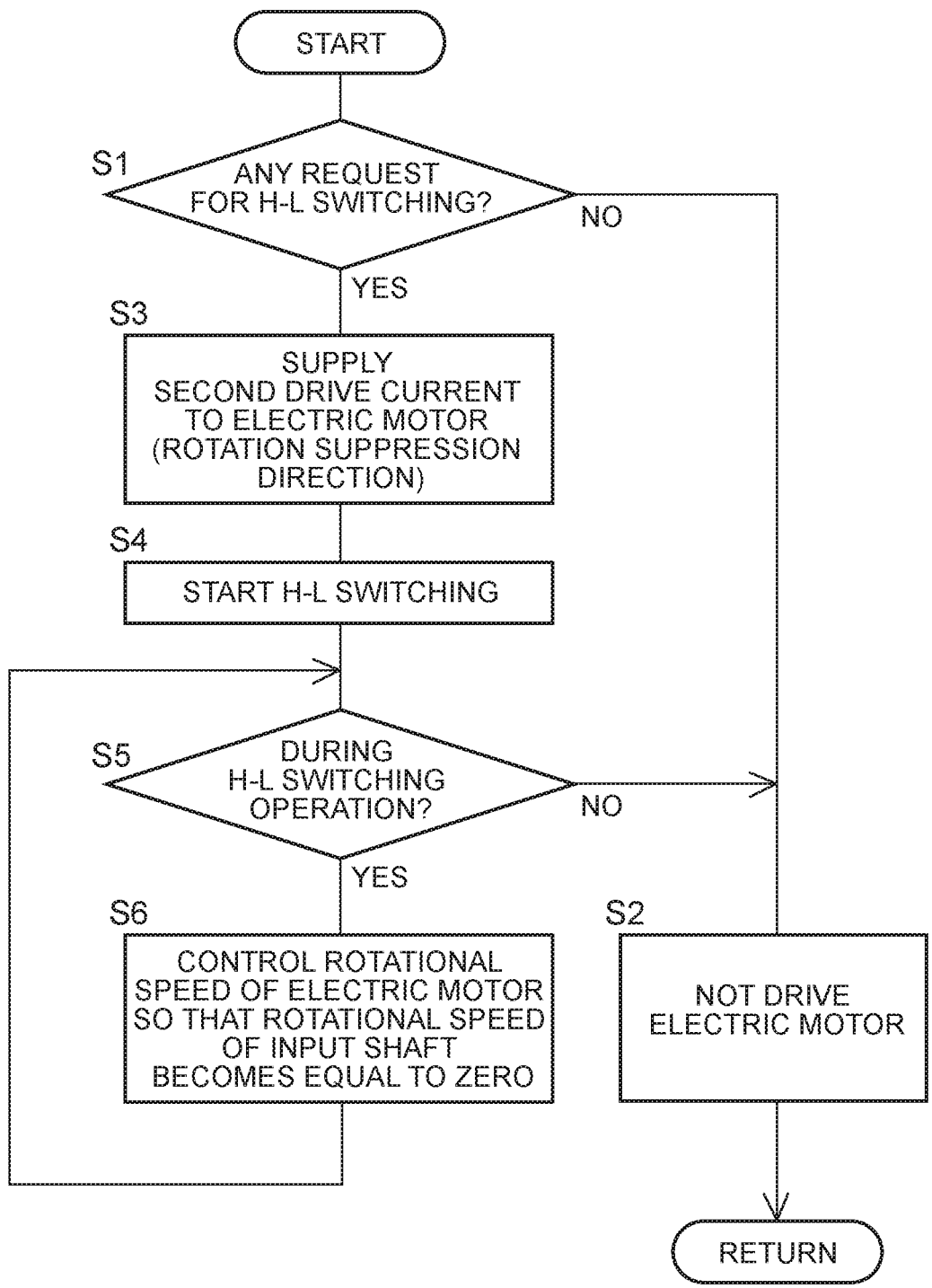
FIG. 9 is a flowchart illustrating a principal part of control operation of the electronic control unit of FIG. 6 to curb increase of the rotational speed of an input shaft, during switching operation of the HIGH-LOW switching mechanism to switch the HIGH-LOW switching sleeve from the high-gear position to the low-gear position or from the low-gear position to the high-gear position while the vehicle is stopped.

FIG. 9 is a flowchart illustrating a principal part of control operation of the electronic control unit 60 for curbing increase of the rotational speed of the input shaft 36, during switching operation of the HIGH-LOW switching mechanism 40 to switch the HIGH-LOW switching sleeve 64 from the high-gear position to the low-gear position or from the low-gear position to the high-gear position while the vehicle is stopped.

Initially, in step S1 corresponding to a function of the HIGH-LOW switching request determining unit 104, it is determined whether a request for switching the HIGH-LOW switching sleeve 64 from the high-gear position to the low-gear position or from the low-gear position to the high-gear position has been made. When a negative decision (NO) is obtained in step S1, step S2 corresponding to a function of the electric motor controller 106 is executed. When an affirmative decision (YES) is obtained in step S1, step S3 corresponding to a function of the electric motor controller 106 is executed. In step S2, supply of the second drive current I2 from the electronic control unit 60 to the electric motor MG is stopped, and the electric motor MG is brought into a non-driven state. In step S3, the second drive current I2 is supplied from the electronic control unit 60 to the electric motor MG, so that given braking torque Ts is applied to the rotor MGr of the electric motor MG, in a direction (rotation suppression direction) to suppress rotation of the input shaft 36 that is apt to rotate due to dragging torque Th.

Next, in step S4 corresponding to a function of the HIGH-LOW switching mechanism controller 108, the first drive current I1 is supplied from the electronic control unit 60 to the fork shaft drive unit 76 of the HIGH-LOW switching actuator 70, so that the HIGH-LOW switching sleeve 64 switches from the high-gear position to the low-gear position, or from the low-gear position to the high-gear position. Then, in step S5 corresponding to a function of the HIGH-LOW switching determining unit 108a, it is determined whether the HIGH-LOW switching sleeve 64 is in the middle of switching operation to switch the HIGH-LOW switching sleeve 64 from the high-gear position to the low-gear position, or from the low-gear position to the high-gear position. When a negative decision (NO) is obtained in step S5, the above step S2 is executed. When an affirmative decision (YES) is obtained in step S5, step S6 corresponding to a function of the electric motor controller 106 is executed. In step S6, when the rotational speed of the input shaft 36 becomes higher than zero, the rotational speed Nmg of the rotor MGr of the electric motor MG is controlled so that the rotational speed of the input shaft 36 becomes equal to zero, or close to zero. Note that "the rotational speed of the input shaft 36 becomes equal to zero" stated in step S6 may include not only "the rotational speed of the input shaft 36 becomes exactly equal to zero", but also "the rotational speed of the input shaft 36 becomes substantially equal to zero".

As described above, the power transmission system 18 of this embodiment includes the transfer case 22, electric motor MG, and the electronic control unit 60 that controls the rotational speed Nmg of the electric motor MG. The transfer case 22 has the input shaft 36 configured to receive power from the engine 12, output shaft 38 that transmits power to the rear wheels 16 and the front wheels 14, planetary gear device 62 having the sun gear S coupled to the input shaft 36 and selectively coupled to the output shaft 38, carrier CA selectively coupled to the output shaft 38, and the ring gear R coupled to the transfer housing 22a, and the HIGH-LOW switching mechanism 40 including the HIGH-LOW switching sleeve 64 that selectively couples the output shaft 38 to the sun gear S and the carrier CA. The electric motor MG is coupled to the carrier CA. The electronic control unit 60 controls the rotational speed Nmg of the electric motor MG, so that the rotational speed of the input shaft 36 becomes equal to zero during switching operation of the HIGH-LOW switching mechanism 40 while the vehicle is stopped. Therefore, the rotational speed Nmg of the electric motor MG is controlled by the electronic control unit 60, during switching operation of the HIGH-LOW switching mechanism 40 while the vehicle is stopped, so that the rotational speed of the input shaft 36 is made equal to zero. Thus, the rotational speed of the input shaft 36, namely, the rotational speeds of the sun gear S and the carrier CA, are prevented from increasing during switching operation of the HIGH- LOW switching mechanism 40. Accordingly, unusual sound that would be generated from the HIGH-LOW switching sleeve 64 as the rotational speed of the input shaft 36 increases during switching operation of the HIGH-LOW switching mechanism 40 while the vehicle is stopped is favorably suppressed.

Also, according to the power transmission system 18 of this embodiment, the HIGH-LOW switching mechanism 40 is operable to change the rotational speed of the input shaft 36 and transmit a resulting rotation to the output shaft 38, through switching operation of the HIGH-LOW switching mechanism 40 to switch, by the HIGH-LOW switching actuator 70, the HIGH-LOW switching sleeve 64 between the high-gear position in which the HIGH-LOW switching sleeve 64 engages with the HIGH-side gear teeth 68 formed on the sun gear S, and the low-gear position in which the sleeve 64 engages with the LOW-side gear teeth 66 formed on the carrier CA. Therefore, unusual sound that generated when the HIGH-LOW switching sleeve 64 engages with the HIGH-side gear teeth 68 or the LOW-side gear teeth 66 during switching operation of the HIGH-LOW switching mechanism 40 while the vehicle is stopped is favorably suppressed.

Next, other embodiments of the disclosure will be described. The same reference numerals are assigned to portions or components common to the above first embodiment and the other embodiments, and the portions or components will not be further described.

Referring to FIG. 10 through FIG. 15, a power transmission system according to a second embodiment of the disclosure will be described. The power transmission system of this embodiment is different from the power transmission system 18 of the first embodiment in that a part of the functions of the electronic control unit 60 is changed so as to switch the HIGH-LOW switching sleeve 64 from the high-gear position to the low-gear position or from the low-gear position to the high-gear position while the vehicle is traveling, too. However, the power transmission system of this embodiment is substantially identical with the power transmission system 18 of the first embodiment in the other respects.

Figure 10:
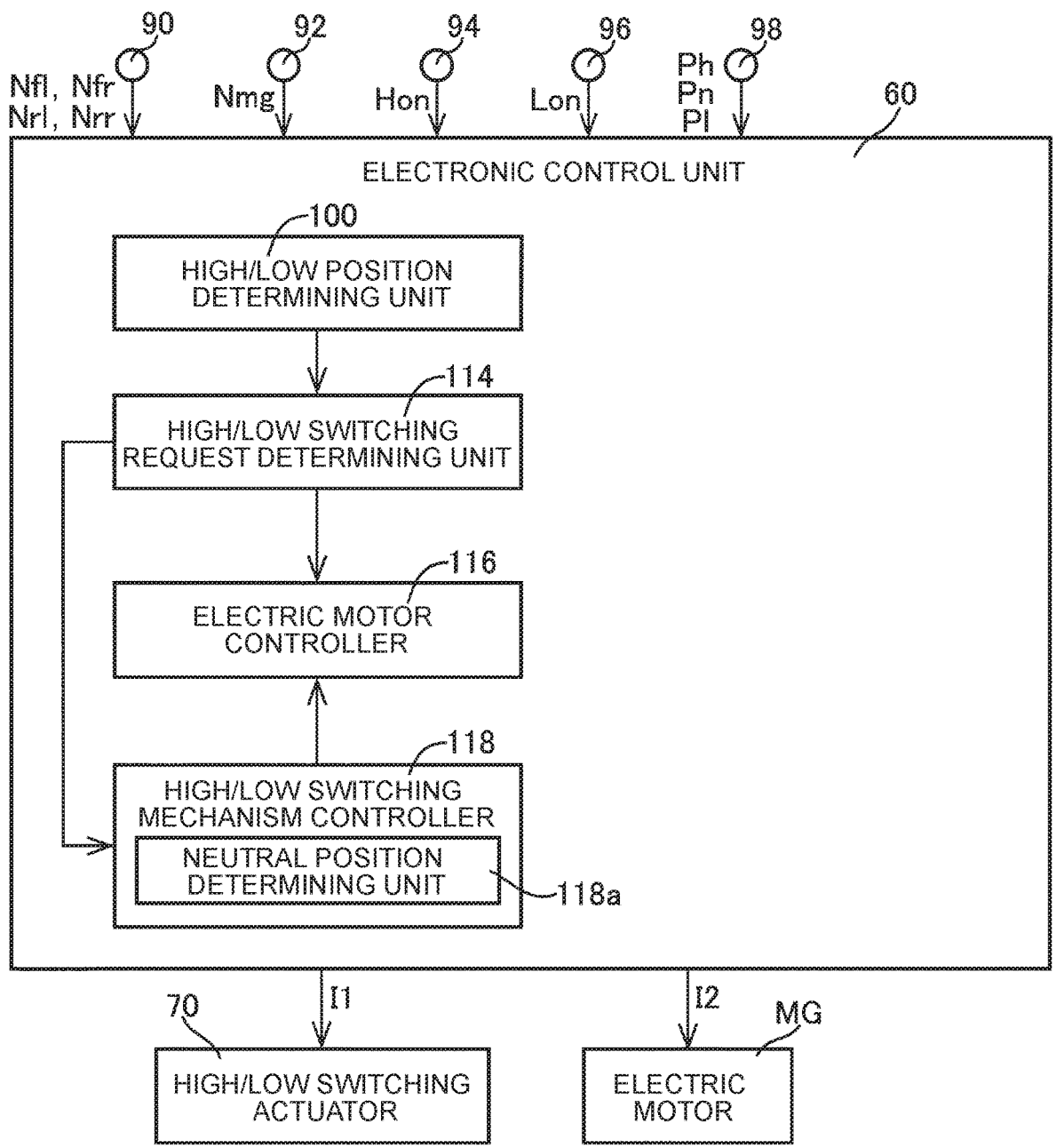
FIG. 10 is a view illustrating a power transmission system according to a second embodiment of the disclosure, and is also a functional block diagram illustrating a principal part of control functions included in an electronic control unit provided in the power transmission system.

When the HIGH-LOW position determining unit 100 determines that the HIGH-LOW switching sleeve 64 is in the high-gear position or in the low-gear position, while the vehicle is stopped or the vehicle is traveling, a HIGH-LOW switching request determining unit 114 of FIG. 10 determines whether a request for switching the HIGH-LOW switching sleeve 64 from the high-gear position to the low-gear position, or a request for switching the HIGH-LOW switching sleeve 64 from the low-gear position to the high-gear position has been made. When the HIGH-LOW switching request determining unit 114 determines that a request for switching the HIGH-LOW switching sleeve 64 from the high-gear position to the lower-gear position has been made, or a request for switching the HIGH-LOW switching sleeve 64 from the low-gear position to the high-gear position has been made, while the vehicle is stopped or the vehicle is traveling, a HIGH-LOW switching mechanism controller 118 causes the first drive current I1 to be supplied from the electronic control unit 60 to the fork shaft drive unit 76 of the HIGH-LOW switching actuator 70, so that the HIGH-LOW switching sleeve 64 moves in the direction of the first rotation axis C1, according to the switching request of the HIGH-LOW switching sleeve 64 determined by the HIGH-LOW switching request determining unit 114. For example, when the HIGH-LOW switching request determining unit 114 determines that a request for switching the HIGH-LOW switching sleeve 64 from the high-gear position to the low-gear position has been made, the HIGH-LOW switching mechanism controller 118 causes the first drive current I1 to be supplied from the electronic control unit 60 to the fork shaft drive unit 76, so that the HIGH-LOW switching sleeve 64 is switched from the high-gear position to the low-gear position, namely, the inner spline teeth 64a of the HIGH-LOW switching sleeve 64 move away from the HIGH-side gear teeth 68. Also, for example, when the HIGH-LOW switching request determining unit 114 determines that a request for switching the HIGH-LOW switching sleeve 64 from the low-gear position to the high-gear position has been made, the HIGH-LOW switching mechanism controller 118 causes the first drive current I1 to be supplied from the electronic control unit 60 to the fork shaft drive unit 76, so that the HIGH-LOW switching sleeve 64 is switched from the low-gear position to the high-gear position, namely, the outer spline teeth 64b of the HIGH-LOW switching sleeve 64 move away from the LOW-side gear teeth 66.

When the HIGH-LOW switching mechanism controller 118 causes the first drive current I1 to be supplied from the electronic control unit 60 to the fork shaft drive unit 76 of the HIGH-LOW switching actuator 70, a neutral position determining unit 118a provided in the HIGH-LOW switching mechanism controller 118 determines whether the HIGH-LOW switching sleeve 64 is in the neutral position, during switching operation to switch the HIGH-LOW switching sleeve 64 from the high-gear position to the low-gear position or from the low-gear position to the high-gear position. For example, the neutral position determining unit 118a determines that the HIGH-LOW switching sleeve 64 is in the neutral position, while the electronic control unit 60 is receiving the signal Pn detected by the position sensor 98.

When the HIGH-LOW switching request determining unit 114 determines that a request for switching the HIGH-LOW switching sleeve 64 from the high-gear position to the low-gear position, or a request for switching the HIGH-LOW switching sleeve 64 from the low-gear position to the high-gear position has been made, and the neutral position determining unit 118a determines that the HIGH-LOW switching sleeve 64 is in the neutral position while the vehicle is stopped or the vehicle is traveling, the electric motor controller 116 controls the rotational speed Nmg of the rotor MGr of the electric motor MG so that the rotational speed of the sun gear S, or the input shaft 36, or the rotational speed of the carrier CA becomes equal to the rotational speed of the output shaft 38. When the HIGH-LOW switching request determining unit 114 determines that no request for switching the HIGH-LOW switching sleeve 64 from the high-gear position to the low-gear position, and no request for switching the HIGH-LOW switching sleeve 64 from the low-gear position to the high-gear position have been made, the electric motor controller 116 stops supply of the second drive current I2 from the electronic control unit 60 to the electric motor MG, and brings the electric motor MG into a non-driven state. Also, when the neutral position determining unit 118a determines that the HIGH-LOW switching sleeve 64 is not in the neutral position, the electric motor controller 116 stops supply of the second drive current I2 from the electronic control unit 60 to the electric motor MG, and brings the electric motor MG into the non-driven state.

For example, when the HIGH-LOW switching request determining unit 114 determines that a request for switching the HIGH-LOW switching sleeve 64 from the high-gear position to the low-gear position, or a request for switching the HIGH-LOW switching sleeve 64 from the low-gear position to the high-gear position has been made, while the vehicle is stopped, and the neutral position determining unit 118*a* determines that the HIGH-LOW switching sleeve 64 is in the neutral position, the electric motor controller 116 controls the rotational speed Nmg of the rotor MGr of the electric motor MG so that the rotational speed of the input shaft 36 becomes equal to zero.

Figure 11A:
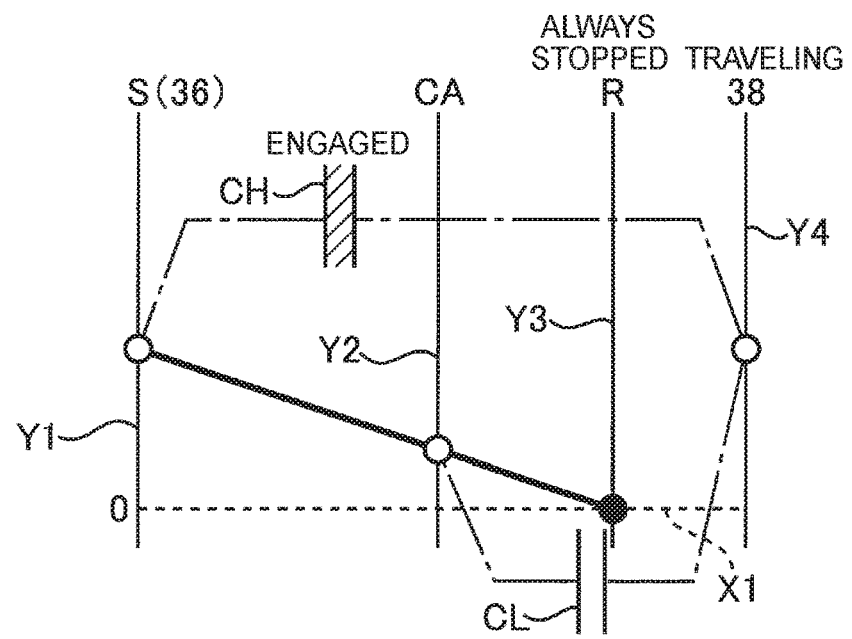
FIG. 11A is a nomographic chart showing a condition at the time when a HIGH-LOW switching sleeve is switched from a high-gear position to a low-gear position while the vehicle is traveling, and showing a condition where the HIGH-LOW switching sleeve is in the high-gear position, and a clutch for high-speed gear position is engaged.
Figure 11B:
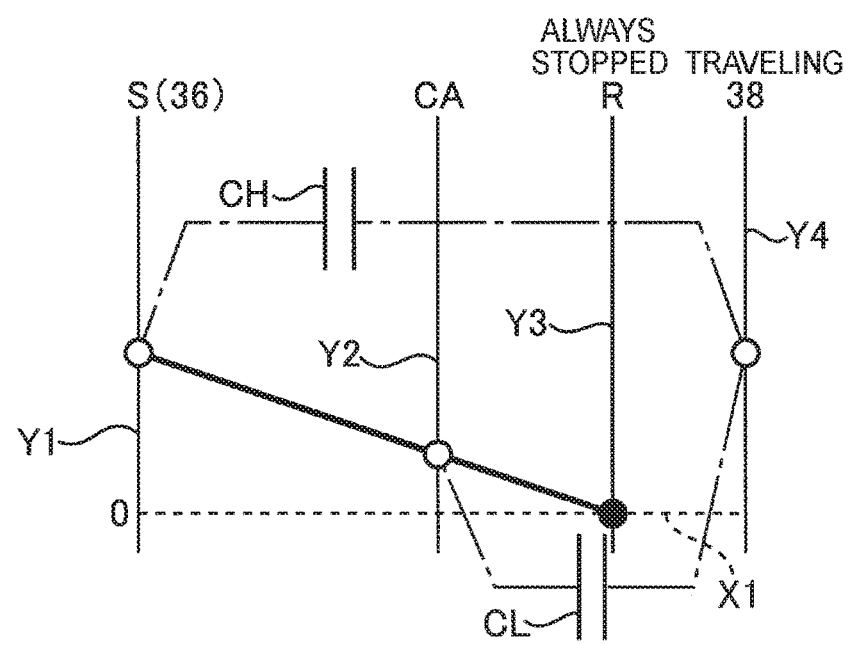
FIG. 11B is a nomographic chart showing a condition at the time when the HIGH-LOW switching sleeve is switched from the high-gear position to the low-gear position while the vehicle is traveling, and showing a condition where the HIGH-LOW switching sleeve is in a neutral position.
Figure 12A:
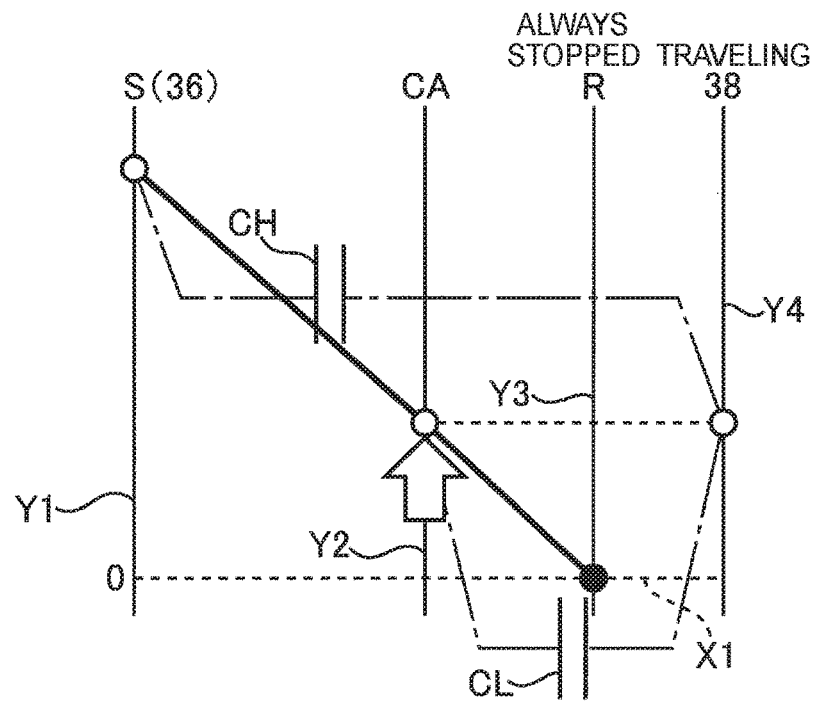
FIG. 12A is a nomographic chart showing a condition at the time when the HIGH-LOW switching sleeve is switched from the high-gear position to the low-gear position while the vehicle is traveling, and showing a condition where the HIGH-LOW switching sleeve is in the neutral position.
Figure 12B:
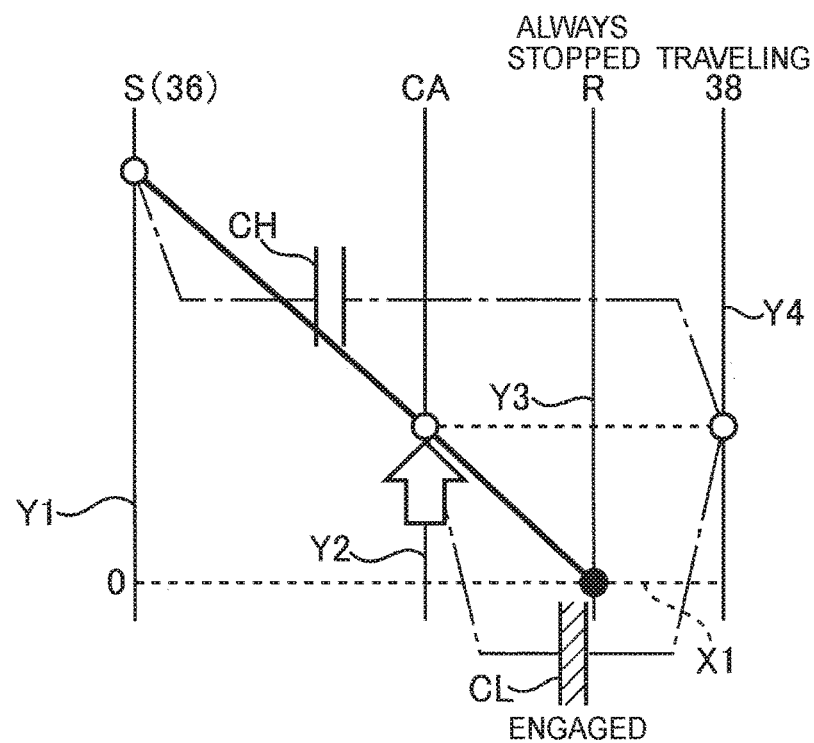
FIG. 12B is a nomographic chart showing a condition at the time when the HIGH-LOW switching sleeve is switched from the high-gear position to the low-gear position while the vehicle is traveling, and showing a condition where the HIGH-LOW switching sleeve is in the low-gear position, and a clutch for low-speed gear position is engaged.

When the HIGH-LOW switching request determining unit 114 determines that a request for switching the HIGH-LOW switching sleeve 64 from the high-gear position to the low-gear position has been made, while the vehicle is traveling, and the neutral position determining unit 118*a* determines that the HIGH-LOW switching sleeve 64 is in the neutral position, as shown in FIG. 11B, the electric motor controller 116 controls the rotational speed Nmg of the rotor MGr of the electric motor MG so that the rotational speed of the carrier CA becomes equal to the rotational speed of the output shaft 38, as shown in FIG. 12A. FIG. 11A shows a condition where the HIGH-LOW switching sleeve 64 is in the high-gear position, and the clutch CH for high-speed gear position is engaged, while the vehicle is traveling. FIG. 12B shows a condition where the HIGH-LOW switching sleeve 64 has been switched from the high-gear position to the low-gear position, and the clutch CL for low-speed gear position is engaged, while the vehicle is traveling.

Figure 13A:
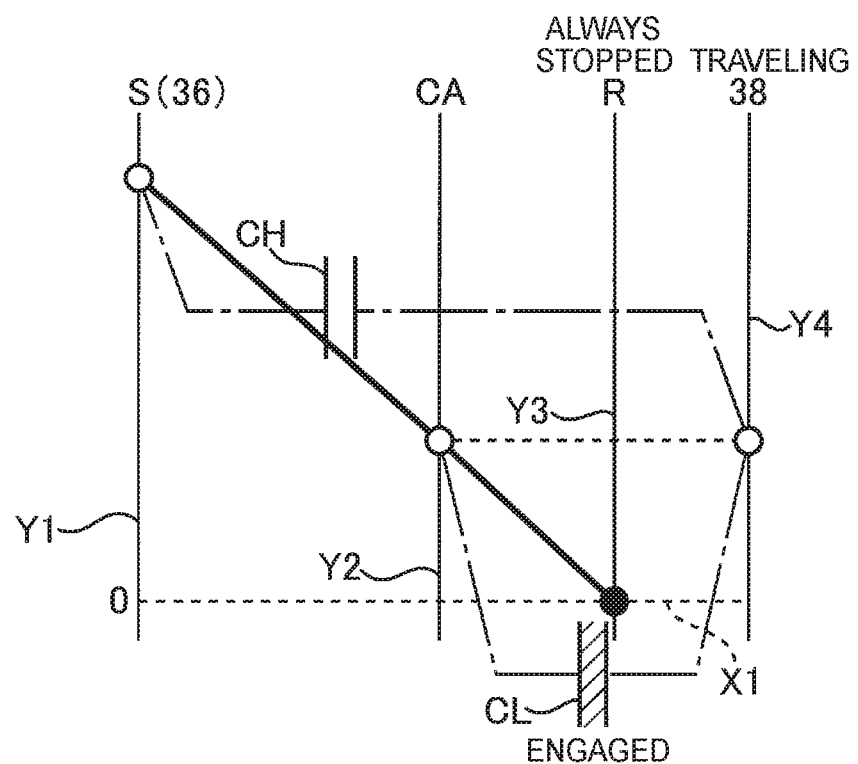
FIG. 13A is a nomographic chart showing a condition at the time when the HIGH-LOW switching sleeve is switched from the low-gear position to the high-gear position while the vehicle is traveling, and showing a condition where the HIGH-LOW switching sleeve is in the low-gear position, and a clutch for low-speed gear position is engaged.
Figure 13B:
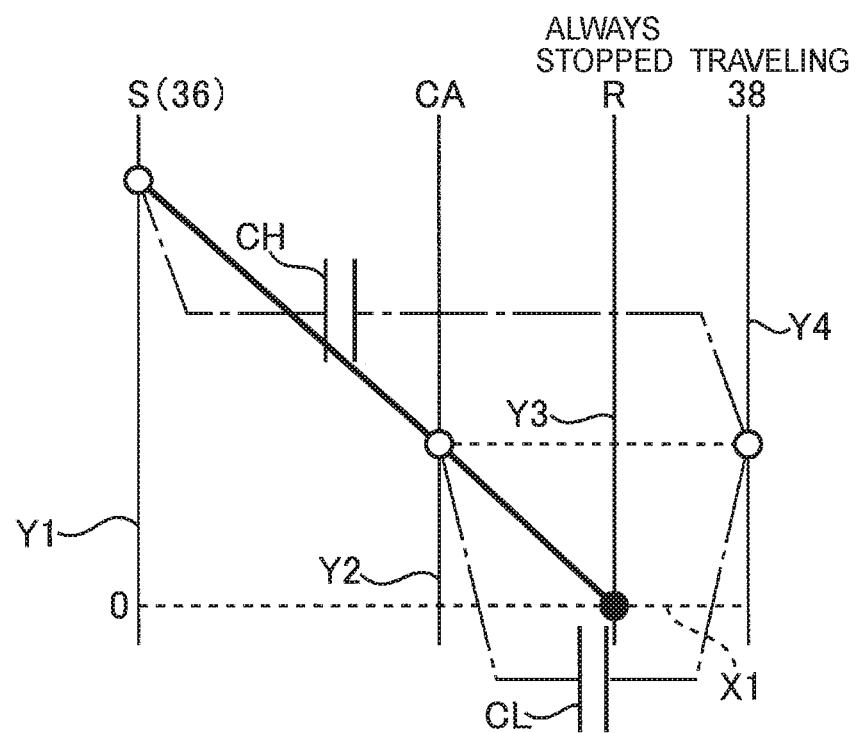
FIG. 13B is a nomographic chart showing a condition at the time when the HIGH-LOW switching sleeve is switched from the low-gear position to the high-gear position while the vehicle is traveling, and showing a condition where the HIGH-LOW switching sleeve is in the neutral position.
Figure 14A:
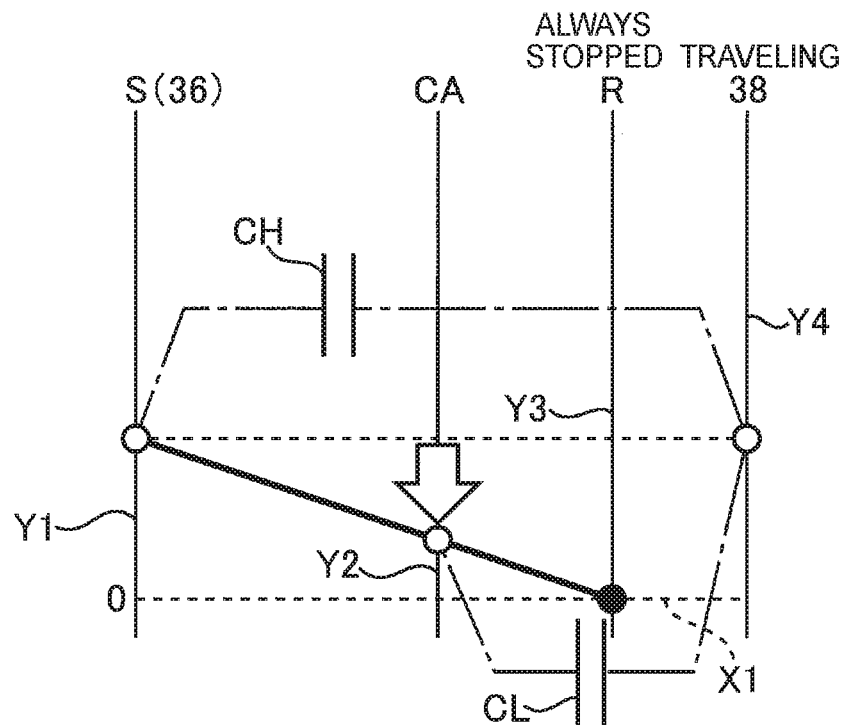
FIG. 14A is a nomographic chart showing a condition at the time when the HIGH-LOW switching sleeve is switched from the low-gear position to the high-gear position while the vehicle is traveling, and showing a condition where the HIGH-LOW switching sleeve is in the neutral position.
Figure 14B:
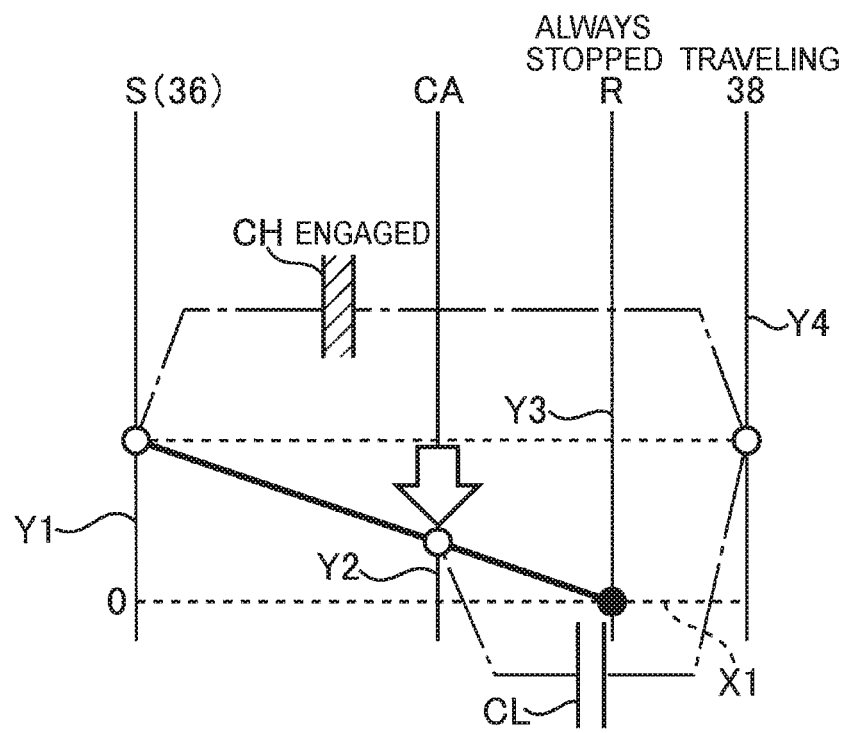
FIG. 14B is a nomographic chart showing a condition at the time when the HIGH-LOW switching sleeve is switched from the low-gear position to the high-gear position while the vehicle is traveling, and showing a condition where the HIGH-LOW switching sleeve is in the high-gear position, and a clutch for high-speed gear position is engaged.

When the HIGH-LOW switching request determining unit 114 determines that a request for switching the HIGH-LOW switching sleeve 64 from the low-gear position to the high-gear position has been made, while the vehicle is traveling, and the neutral position determining unit 118*a* determines that the HIGH-LOW switching sleeve 64 is in the neutral position, as shown in FIG. 13B, the electric motor controller 116 controls the rotational speed Nmg of the rotor MGr of the electric motor MG so that the rotational speed of the sun gear S, or the input shaft 36, becomes equal to the rotational speed of the output shaft 38, as shown in FIG. 14A. FIG. 13A shows a condition where the HIGH-LOW switching sleeve 64 is in the low-gear position, and the clutch CL for low-speed gear position is engaged, while the vehicle is traveling. FIG. 14B shows a condition where the HIGH-LOW switching sleeve 64 has been switched from the low-gear position to the high-gear position, and the clutch CH for high-speed gear position is engaged, while the vehicle is traveling.

FIG. 15 is a flowchart of the control executed by the electronic control unit 60. FIG. 15 illustrates a principal part of switching control operation of the HIGH-LOW switching mechanism 40 to switch the HIGH-LOW switching sleeve 64 from the high-gear position to the low-gear position, or from the low-gear position to the high-gear position, while the vehicle is stopped or the vehicle is traveling.

Initially, in step S11 corresponding to a function of the HIGH-LOW position determining unit 100, it is determined whether the HIGH-LOW switching sleeve 64 is in the high-gear position. When an affirmative decision (YES) is obtained in step S11, namely, when the HIGH-LOW switching sleeve 64 is in the high-gear position, step S12 corresponding to a function of the HIGH-LOW switching request determining unit 114 is executed. When a negative decision (NO) is obtained in step S11, namely, when the HIGH-LOW switching sleeve 64 is in the low-gear position, step S13 corresponding to a function of the HIGH-LOW switching request determining unit 114 is executed. In step S12, it is determined whether a request for switching the HIGH-LOW switching sleeve 64 from the high-gear position to the low-gear position has been made. In step S13, it is determined whether a request for switching the HIGH-LOW switching sleeve 64 from the low-gear position to the high-gear position has been made. When an affirmative decision (YES) is obtained in step S12, step S14 corresponding to a function of the HIGH-LOW switching mechanism controller 118 is executed. When a negative decision (NO) is obtained in step S12, step S15 corresponding to a function of the electric motor controller 116 is executed. In step S14, the first drive current I1 is supplied from the electronic control unit 60 to the fork shaft drive unit 76 of the HIGH-LOW switching actuator 70, so that the HIGH-LOW switching sleeve 64 is switched from the high-gear position to the low-gear position. In step S15, supply of the second drive current I2 from the electronic control unit 60 to the electric motor MG is stopped, and the electric motor MG is brought into a non-driven state.

Then, in step S16 corresponding to a function of the neutral position determining unit 118*a*, it is determined whether the HIGH-LOW switching sleeve 64 is in the neutral position. When a negative decision (NO) is obtained in step S16, step S15 as described above is executed. When an affirmative decision (YES) is obtained in step S16, step S17 corresponding to a function of the electric motor controller 116 is executed. In step S17, the rotational speed Nmg of the rotor MGr of the electric motor MG is controlled, so that the rotational speed of the carrier CA becomes equal to the rotational speed of the output shaft 38. Note that "the rotational speed of the carrier CA becomes equal to the rotational speed of the output shaft 38" stated in step S17 may include not only "the rotational speed of the carrier CA becomes exactly equal to the rotational speed of the output shaft 38", but also "the rotational speed of the carrier CA becomes substantially equal to the rotational speed of the output shaft 38".

When a negative decision (NO) is obtained in step S13, step S15 as described above is executed. When an affirmative decision (YES) is obtained in step S13, step S18 corresponding to a function of the HIGH-LOW switching mechanism controller 118 is executed. In step S18, the first drive current I1 is supplied from the electronic control unit 60 to the fork shaft drive unit 76 of the HIGH-LOW switching actuator 70, so that the HIGH-LOW switching sleeve 64 is switched from the low-gear position to the high-gear position. Then, in step S19 corresponding to a function of the neutral position determining unit 118*a*, it is determined whether the HIGH-LOW switching sleeve 64 is in the neutral position. When a negative decision (NO) is obtained in step S19, step S15 as described above is executed. When an affirmative decision (YES) is obtained in step S19, step S20 corresponding to a function of the electric motor controller 116 is executed. In step S20, the rotational speed Nmg of the rotor MGr of the electric motor MG is controlled, so that the rotational speed of the sun gear S, or the input shaft 36, becomes equal to the rotational speed of the output shaft 38. Note that "the rotational speed of the sun gear S becomes equal to the rotational speed of the output shaft 38" stated in step S20 may include not only "the rotational speed of the sun gear S becomes exactly equal to the rotational speed of the output shaft 38", but also "the rotational speed of the sun gear S becomes substantially equal to the rotational speed of the output shaft 38".

As described above, according to the power transmission system of this embodiment, when the HIGH-LOW switching mechanism 40 performs switching operation during traveling of the vehicle, the electronic control unit 60 controls the rotational speed Nmg of the electric motor MG so that the rotational speed of the sun gear S or the rotational speed of the carrier CA becomes equal to the rotational speed of the output shaft 38. Therefore, the HIGH-LOW switching mechanism 40 can perform switching operation even during traveling of the vehicle, and unusual sound that would be generated from the HIGH-LOW switching sleeve 64 during switching operation of the HIGH-LOW switching mechanism 40 while the vehicle is traveling is favorably suppressed.

Also, according to the power transmission system of this embodiment, when the HIGH-LOW switching sleeve 64 is switched from the high-gear position to the low-gear position during traveling of the vehicle, the electronic control unit 60 controls the rotational speed Nmg of the electric motor MG so that the rotational speed of the carrier CA becomes equal to the rotational speed of the output shaft 38, while the HIGH-LOW switching sleeve 64 is in the neutral position in which the sleeve 64 engages with neither the HIGH-side gear teeth 68 nor the LOW-side gear teeth 66. Therefore, during switching operation of the HIGH-LOW switching mechanism 40 to switch the HIGH-LOW switching sleeve 64 from the high-gear position to the low-gear position while the vehicle is traveling, unusual sound generated at the time of engagement of the HIGH-LOW switching sleeve 64 with the LOW-side gear teeth 66 is favorably suppressed.

According to the power transmission system of this embodiment, when the HIGH-LOW switching sleeve 64 is switched from the low-gear position to the high-gear position during traveling of the vehicle, the electronic control unit 60 controls the rotational speed Nmg of the electric motor MG so that the rotational speed of the sun gear S becomes equal to the rotational speed of the output shaft 38, while the HIGH-LOW switching sleeve 64 is in the neutral position in which the sleeve 64 engages with neither the HIGH-side gear teeth 68 nor the LOW-side gear teeth 66. Therefore, during switching operation of the HIGH-LOW switching mechanism 40 to switch the HIGH-LOW switching sleeve 64 from the low-gear position to the high-gear position while the vehicle is traveling, unusual sound generated at the time of engagement of the HIGH-LOW switching sleeve 64 with the HIGH-side gear teeth 68 is favorably suppressed.

Figure 16:
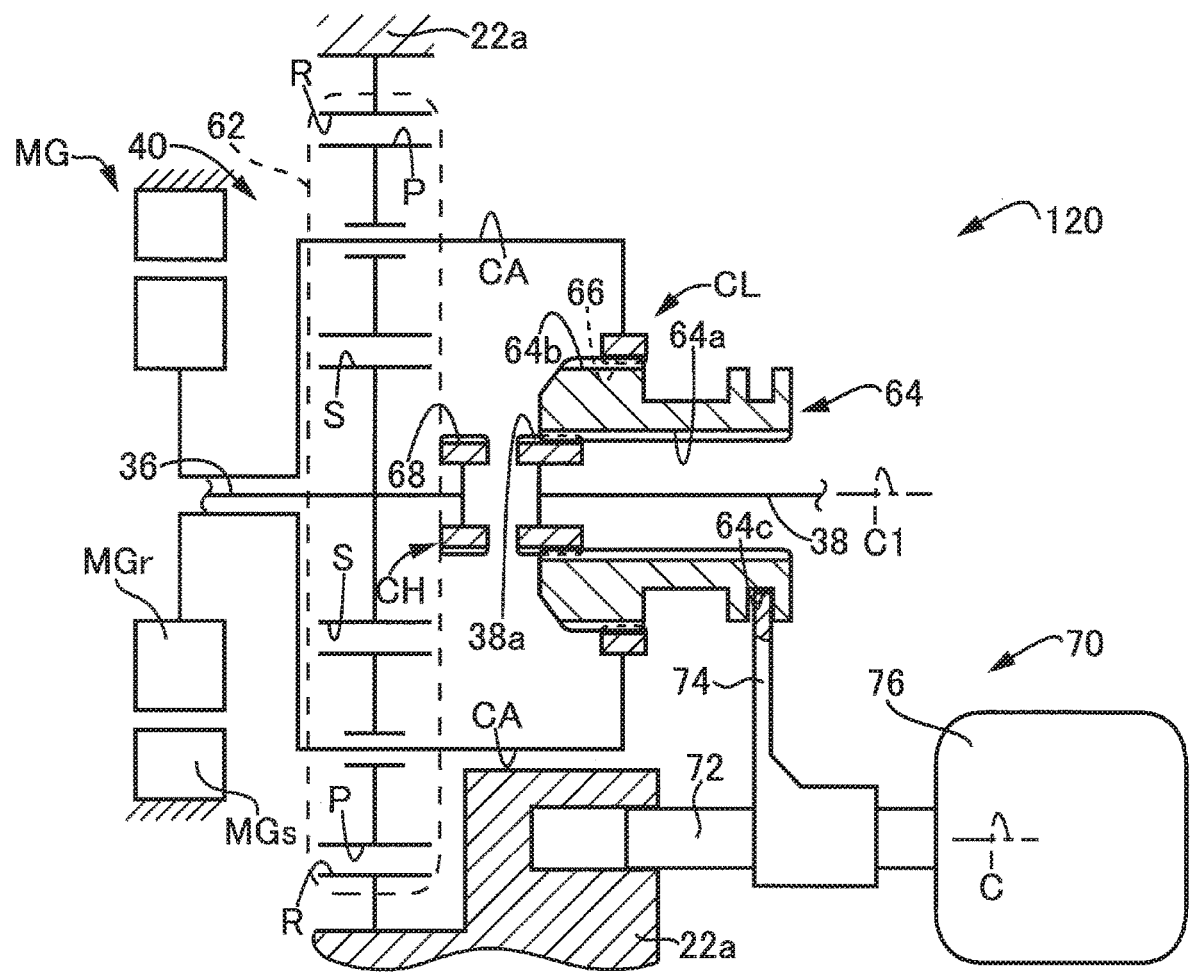
FIG. 16 is a view illustrating a power transmission system according to a third embodiment of the disclosure.

FIG. 16 shows a power transmission system according to a third embodiment of the disclosure, more specifically, a transfer case 120 provided in the power transmission system. The power transmission system of the third embodiment is different from the power transmission system 18 of the first embodiment in that the rotor MGr of the electric motor MG is directly connected to the carrier CA, but is substantially identical with the power transmission system 18 of the first embodiment in the other respects. In the first embodiment, the rotor MGr of the electric motor MG is indirectly connected to the carrier CA via the first gear 80 and the second gear 82.

Figure 17:
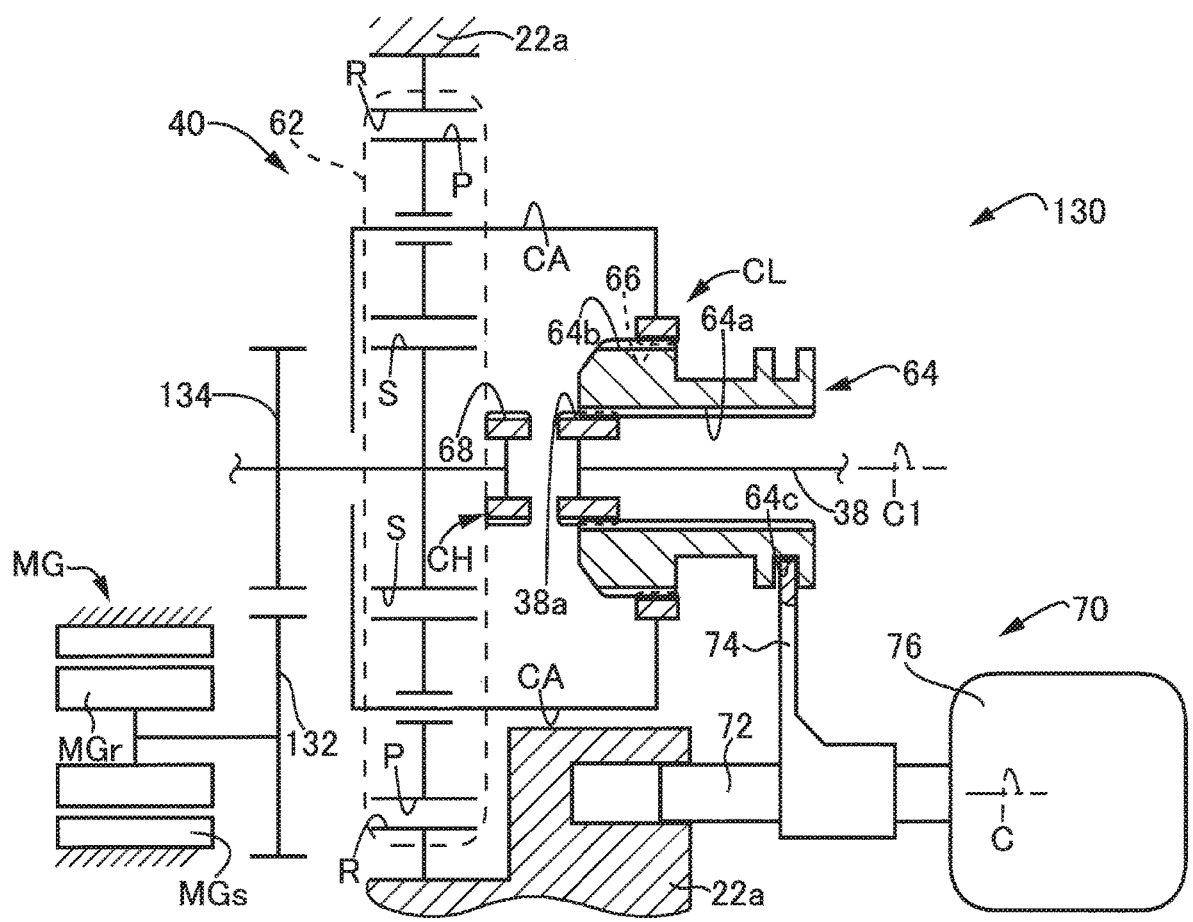
FIG. 17 is a view illustrating a power transmission system according to a fourth embodiment of the disclosure.

FIG. 17 shows a power transmission system according to a fourth embodiment of the disclosure, more specifically, a transfer case 130 provided in the power transmission system. The power transmission system of the fourth embodiment is different from the power transmission system 18 of the first embodiment in that the rotor MGr of the electric motor MG is indirectly connected to the sun gear S or the input shaft 36, via a first gear 132 and a second gear 134, but is substantially identical with the power transmission system 18 of the first embodiment in the other respects.

Figure 18:
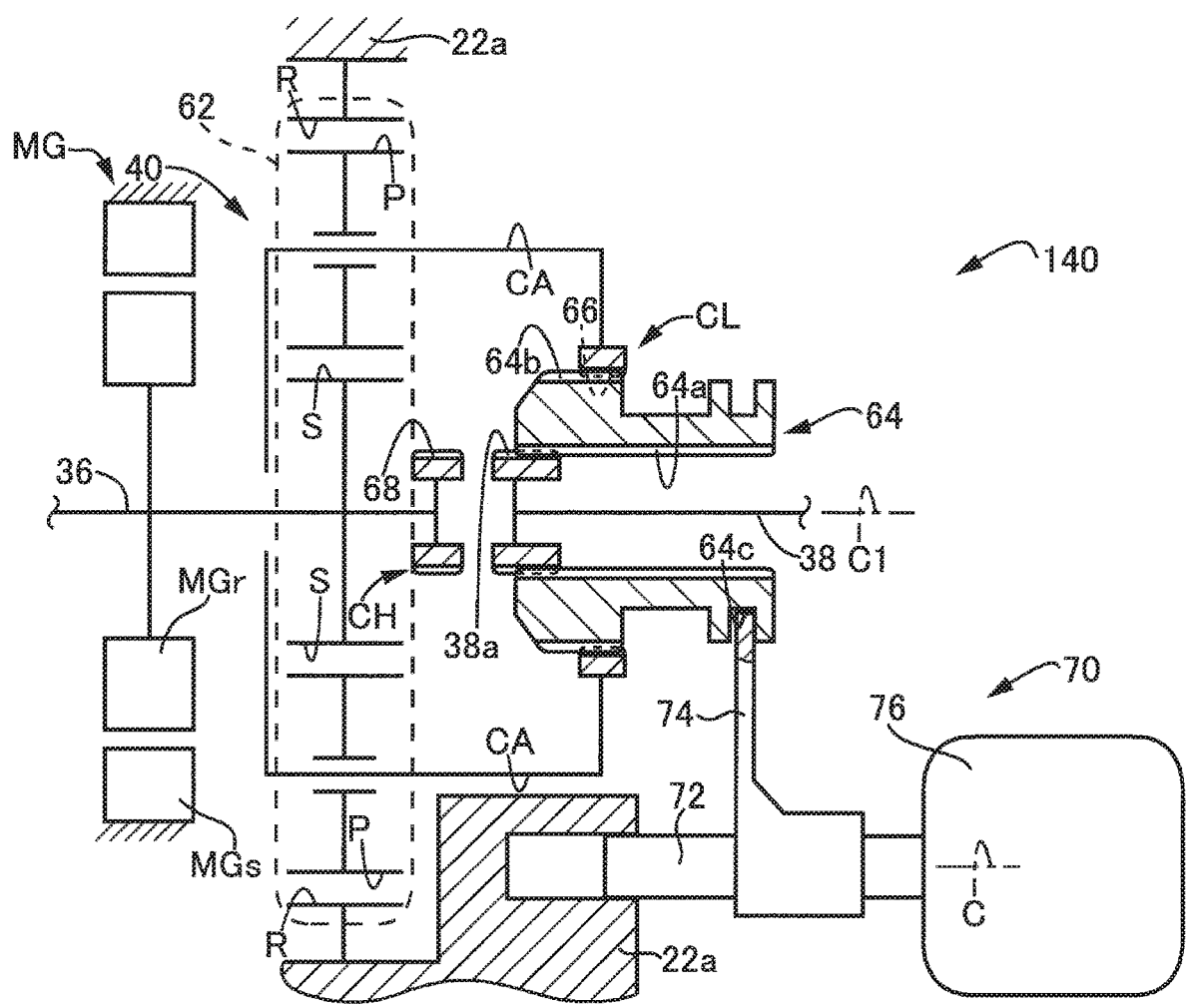
FIG. 18 is a view showing a power transmission system according to a fifth embodiment of the disclosure.

FIG. 18 shows a power transmission system according to a fifth embodiment of the disclosure, more specifically, a transfer case 140 provided in the power transmission system. The power transmission system of the fifth embodiment is different from the power transmission system of the fourth embodiment as described above, in that the rotor MGr of the electric motor MG is directly coupled to the sun gear S or the input shaft 36, but is substantially identical with the power transmission system of the fourth embodiment in the other respects.

In the illustrated embodiments, when the high-gear selection switch 94 or the low-gear selection switch 96 is operated by the driver, for example, the HIGH-LOW switching request determining unit 114 determines that a request for switching the HIGH-LOW switching sleeve 64 from the low-gear position to the high-gear position or from the high-gear position to the low-gear position has been made. However, the HIGH-LOW switching request determining unit 114 may automatically determine that a request for switching the HIGH-LOW switching sleeve 64 from the low-gear position to the high-gear position or from the high-gear position to the low-gear position has been made, according to traveling conditions of the vehicle 10 during traveling of the vehicle.

Also, in the illustrated embodiments, the fork shaft drive unit 76 of the HIGH-LOW switching actuator 70 includes an electric motor that is driven with first drive current I1 supplied from the electronic control unit 60, and a conversion mechanism, such as a screw mechanism, which converts rotary drive power of the electric motor, into drive power applied in the direction of axis C1, and is operable to move the fork shaft 72 in the direction of axis C1. However, the fork shaft drive unit 76 of the HIGH-LOW switching actuator 70 may have any structure provided that it moves the fork shaft 72 in the direction of axis C. For example, the fork shaft drive unit 76 may be a hydraulic actuator, or the like, which moves the fork shaft 72 in the direction of axis C.

What is claimed is:

1. A power transmission system, comprising:
   a transfer case including an input shaft configured to receive power from a drive source, an output shaft configured to transmit power to main drive wheels and sub drive wheels, a planetary gear device including a first rotary element, a second rotary element, and a third rotary element, and a HIGH-LOW switching mechanism including a switching sleeve configured to selectively couple the output shaft to the first rotary element and the second rotary element separately, the first rotary element being coupled to the input shaft and being selectively coupled to the output shaft, the second rotary element being selectively coupled to the output shaft, the third rotary element being coupled to a non-rotary member;
   an electric motor being coupled to one of the first rotary element and the second rotary element; and
   an electronic control unit configured to control a rotational speed of the electric motor, during switching operation of the HIGH-LOW switching mechanism while a vehicle is stopped, such that a rotational speed of the input shaft becomes substantially equal to zero.

2. The power transmission system according to claim 1, wherein
   the electronic control unit is configured to control, when the HIGH-LOW switching mechanism performs switching operation while the vehicle is traveling, the rotational speed of the electric motor, during the switching operation of the HIGH-LOW switching mechanism, such that one of a rotational speed of the first rotary element and a rotational speed of the second rotary element becomes substantially equal to a rotational speed of the output shaft.

3. The power transmission system according to claim 1, wherein
the HIGH-LOW switching mechanism is configured to change the rotational speed of the input shaft and transmit a rotation to the output shaft, through switching operation of the HIGH-LOW switching mechanism, the switching operation including switching the switching sleeve between a high-gear position and a low-gear position by using a shift actuator, the high-gear position being a position in which the switching sleeve engages with HIGH-side gear teeth formed on the first rotary element, the low-gear position being a position in which the switching sleeve engages with LOW-side gear teeth formed on the second rotary element.

4. The power transmission system according to claim 3, wherein
the electronic control unit is configured to control, when the switching sleeve is switched from the high-gear position to the low-gear position while the vehicle is traveling, the rotational speed of the electric motor, while the switching sleeve is in a neutral position in which the switching sleeve engages with neither the HIGH-side gear teeth nor the LOW-side gear teeth, such that the rotational speed of the second rotary element becomes substantially equal to the rotational speed of the output shaft.

5. The power transmission system according to claim 3, wherein
the electronic control unit is configured to control, when the switching sleeve is switched from the low-gear position to the high-gear position while the vehicle is traveling, the rotational speed of the electric motor, while the switching sleeve is in a neutral position in which the switching sleeve engages with neither the HIGH-side gear teeth nor the LOW-side gear teeth, such that the rotational speed of the first rotary element becomes substantially equal to the rotational speed of the output shaft.

6. A control method of a power transmission system,
the power transmission system including a transfer case, an electric motor, and an electronic control unit,
the transfer case including an input shaft configured to receive power from a drive source, an output shaft configured to transmit power to main drive wheels and sub drive wheels, a planetary gear device including a first rotary element, a second rotary element, and a third rotary element, and a HIGH-LOW switching mechanism including a switching sleeve that selectively couples the output shaft to the first rotary element and the second rotary element separately, the first rotary element being coupled to the input shaft and being selectively coupled to the output shaft, the second rotary element being selectively coupled to the output shaft, the third rotary element being coupled to a non-rotary member, the electric motor being coupled to one of the first rotary element and the second rotary element,
the control method comprising:
switching the HIGH-LOW switching mechanism by the electronic control unit; and
controlling a rotational speed of the electric motor by the electronic control unit, during switching operation of the HIGH-LOW switching mechanism while a vehicle is stopped, such that a rotational speed of the input shaft becomes substantially equal to zero.

* * * * *